United States Patent [19]
Stone et al.

[11] 3,818,189
[45] June 18, 1974

[54] DATA CARD READER

[75] Inventors: Robert L. Stone, Portland; David C. Schilke, Middleton, both of Conn.

[73] Assignee: Raymond Engineering, Inc., Middletown, Conn.

[22] Filed: Aug. 1, 1972

[21] Appl. No.: 277,052

[52] U.S. Cl.....235/61.11 R, 235/61.11 E, 250/219 R
[51] Int. Cl....... G06k 13/06, G06k 7/10, G08c 9/06
[58] Field of Search.. 235/61.11 R, 61.11 E, 61.7 B; 250/219 R, 219 D, 219 DC

[56] References Cited

UNITED STATES PATENTS

| | | | |
|---|---|---|---|
| 3,463,906 | 8/1969 | Chiang | 235/61.11 E |
| 3,560,717 | 2/1971 | Patterson | 235/61.11 E |
| 3,676,690 | 7/1972 | McMillin et al. | 235/61.11 E |

*Primary Examiner*—Daryl W. Cook
*Attorney, Agent, or Firm*—David S. Fishman

[57] ABSTRACT

The invention herein generally relates to a data card reader. The data cards to be read have a data format arranged in columns and rows with the initial two columns devoted to a predetermined error check data pattern to be read for determining if the card reader is functioning correctly. A row of timing marks is provided with one timing mark for each column of data, and the leading edge of each timing mark is positioning midway with respect to the data bits in the associated column. The data card further includes a black servo stripe printed parallel to the rows of data along one edge of the card, and two additional black stripes, one at the leading and one at the trailing edges of the card wherein a transition from black to white at the termination of the leading edge stripe activates a data read capability, and a transition from white to black at the trailing edge stripe subsequently deactivates the data read capability.

17 Claims, 36 Drawing Figures

PATENTED JUN 18 1974 3,818,189

SHEET 08 OF 26

SELECT RESISTOR PROCEDURES

| SELECT FOR MIN SENSOR OUTPUT OF 1.50 0.10V FROM TP1 TO TP8
MIN. VALUE 3.5K

| SELECT FOR SENSOR OUTPUT OF 1.30 0.10V FROM TP2 TO TP8
MIN. VALUE 10K

| SELECT FOR SENSOR OUTPUT OF 0.75 0.05V TP3 TO TP8
MIN. VALUE 6.8K

| SELECT FOR SENSOR OUTPUT OF 1.50 0.10V FROM TP1 TO TP8
MIN. VALUE 16

| SELECT FOR SENSOR OUTPUT OF 0.75 0.05V FROM TP3 TO TP8
MIN. VALUE 100

| SELECT FOR SENSOR OUTPUT OF 1.30V 0.10V FROM TP2 TO TP8
MIN. VALUE 100

| SELECT FOR SENSOR OUTPUT OF 1.0V 0.10V FROM TP4 TO AND TP5 TO 9VREF
MIN. VALUE 10K

| SELECT FOR SENSOR OUTPUT OF 1.0V 0.10VFROM TP4AND TP5 TO 9V REF
Min. VALUE 100

FIG.12 C

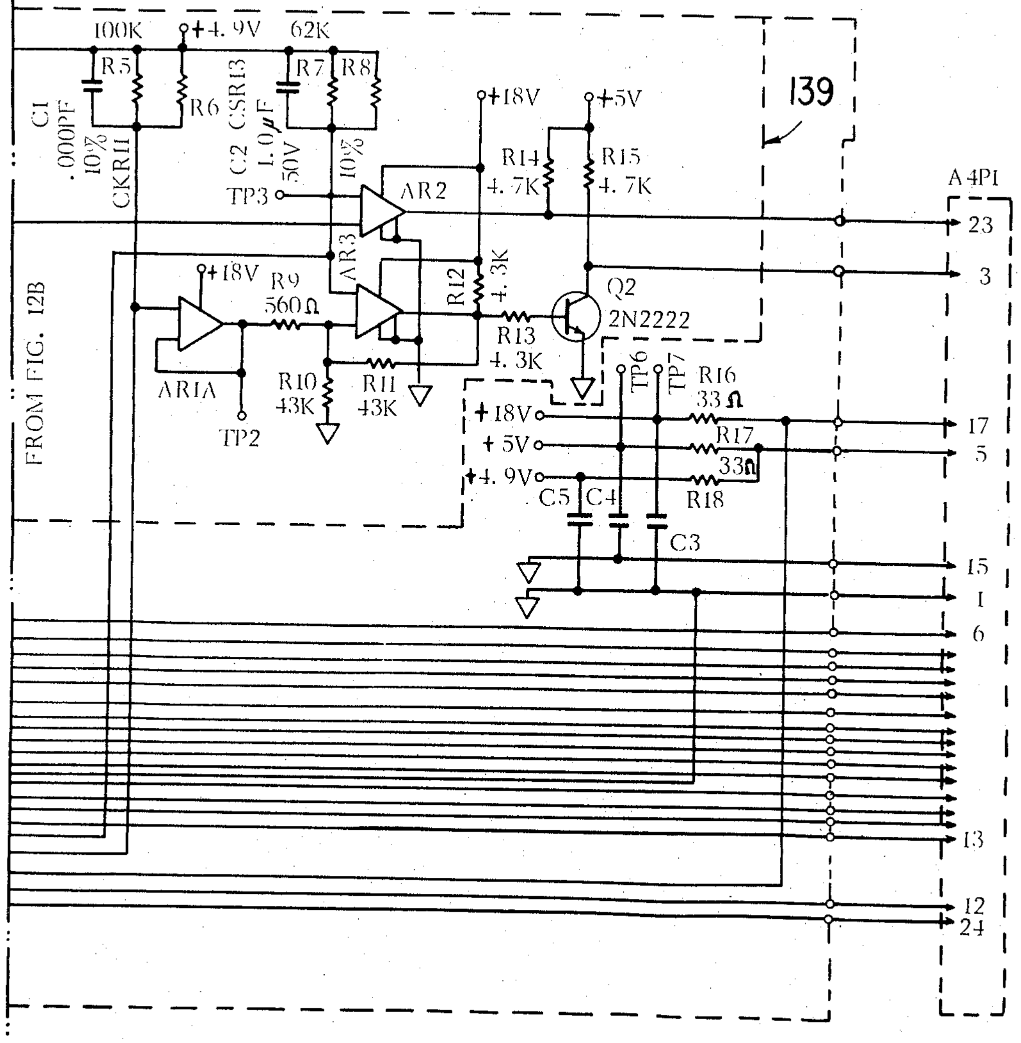

3 SELECT R46 FOR 24 TO 26 SEC POWER ON AT +18VDC OUTPUT RCR07 25K TO150K
2 SELECT R22 FOR TURN ON OF Q11 APPROX. 10.6V AT TP5 WITH 21.5V APPLIED TO +28VDC A/C POWER INPUT
1 SELECT R6 FOR 18.2 TO 18.4V AT 18VDC OUTPUT WITH TP3 CONNECTED TO LGRD RCR07 6.2K TO 48K

PATENTED JUN 18 1974

3,818,189

DATA CARD READER

The data reader according to the invention comprises a housing having one side positioned as a guide for an edge of the data card generally parallel to the servo stripe printed thereon. The data reader further comprises an entry-exit slot protected against moisuture and dust intrusion by a gasket and guide means defining a card path directing the card in a generally teardrop-shaped path within the card reader. An elongated leaf spring is positioned beside the path of the card opposite the guide side urging the card against the guide side.

A capstan roller is positioned adjacent to the path of the card, and engages the card to propel it through the card reader at a uniform rate of speed. The capstan roller is offset toward the guide side of the path, wherein the force of the capstan roller also urges the card against the guide side.

A read head is installed in the housing of the data card reader for transverse sliding moving with respect to the side guide edge. The read head is comprised of an L-shaped aperture plate having three elongated mounting slots. One of the slots is positioned over a cam, and the read head is adjusted transverse to the side wall by means of the cam. The position of the cam is secured, and thereafter the slots function to permit the transverse sliding movement of the read head.

The read head further includes a drive plate having a slot which is positioned parallel to guide wall edge. A cam is mounted therein for driving the read head transversely to the guide edge.

The read head aperture plate has mounted therein a plurality of data sensors comprising light emitting diodes and photo-transistors in sets of one each. Each set of light emitting diode and photo-transistor is focused on a rectangular aperture in the bottom of the aperture plate, which is positioned for contact with the data card as it passes through the card reader. There are a plurality of apertures and data sensors deployed in a straight line across the aperture plate transverse to the side guide edge. The light emitting diodes and photo-transistors are appropriately screened to prevent unwanted crosstalk. Thus, the viewing area of the photo-transistors is defined and limited to a data bit, and interference from other light emitting diodes is eliminated.

The rectangular opening increases the area of the data card exposed to the data sensors, while minimizing the dimensions of the opening. Therefore, there is greater margin for error in positioning the aperture with respect to a data bit, and the accuracy with which the card can be read is increased.

Two of the read head apertures and sensors are positioned approximately above the edges of the servo track of the data card and spaced apart by the width of the servo stripe. The outputs of the two photo-transistors of the sensors are connected through a differential amplifier and power amplifier to drive a second order servo position feedback servo which is critically damped, the servo driving the cam transversely positioning the entire read head assembly over the data card. This arrangement adjusts the position of the read head above the data card such that the output of the two photo-transistors is balanced, indicating that the two apertures are positioned precisely flanking the servo stripe. In this position, the remainder of the apertures are positioned precisely over the data rows and timing marks on the data card. If a skew of the data or lateral misplacement of the data on the data card is present with respect to the edge of the data card, the output of the two photo-transistors above the servo track will become unbalanced, wherein the servo motor drives the cam to reposition the read head such that the output of the two photo-transistors is again balanced. Thus, there is continual adjustment of the position of the read head with respect to the card data such that the apertures of the read head are always positioned precisely over the data printed thereon.

The light emitting diodes are associated with the data read function and are turned on in groups, in the embodiment disclosed, in four groups of eight for reading 32 rows of data bits. However, the groups of eight are comprised of, first, the first, fifth, ninth, etc. light emitting diode; then the second, sixth, tenth, etc. light emitting diode; then the third, seventh, eleventh, etc. light emitting diode, and the like. Data is gated out serially from data chips reading the output of the photo-transistors. Thus, each light emitting diode is on for only a short period of time followed by a long off period. Further, no adjacent light emitting diodes are simultaneously illuminated, decreasing any possibility of cross talk and minimizing heat sink problems.

When a card is inserted into the entry-exit slot of the data card reader, a beam of light between a light emitting diode and a photo-transistor is broken. The change in output signal of the photo-transistor is used to turn on the capstan roller and activate the circuits of the card reader, including a seven second timer and a 25 second timer. The card is propelled through the card reader by the capstan roller at a rate of approximately 1 inch per second. When the data card reaches the read head, the servo sensors and servo motor cause the apertures of the aperture plate to be properly aligned with respect to the data on the card, and shortly thereafter the contrast sensor activates the data read circuitry. The predetermined error check pattern is read first, and if it is read correctly, the data is thereafter read and partially decoded by the circuitry of the card reader to provide the data output in ARINC 561 and ARINC 575 format.

If the predetermined error check data pattern is not correctly read prior to the seven second timer timing out, or if the predetermined error check data pattern is read incorrectly, an error signal is provided.

The capstan roller continues to run while the 25 second timer times out, which is an adequate period of time for the card to be returned to the user from the card reader.

BACKGROUND OF THE INVENTION

This invention realtes to reading data from data cards, and more particularly to a data card reader sufficiently accurate, rugged, and reliable for use in adverse environments, such as in aircraft.

Cards as data storage media are well known, as are card readers in general. Data cards are generally of two types, the first of which is a punched or perforated card read by the presence or absence of light transmission through the card. The second type of data card comprises data bit areas which are either light or dark, and reading of the data card is accomplished by illuminating a data bit area and monitoring the reflectance of light therefrom. Such data cards have the advantage of printed data entry or manual data entry as blackening data squares.

The cards and card reader of the invention herein relate to the latter type of card.

Some of the problems in constructing a card reader are positioning of the card in the card reader so that data bit areas are properly positioned with respect to the data read sensors. This usually takes the form of positioning the edge of the card against a reference deck or side wall and providing means for maintaining the edge of the card against the reference deck as the card passes through the card reader. The data sensors are also positioned relative to the reference deck.

Another problem is correcting for printing errors in the data cards. Although the patterns printed on the cards may be controlled within acceptable tolerances, the pattern itself may be skewed with respect to the edge of the card. The problem is therefore more particularly correcting the positions of the data sensors as the card passes thereunder to compensate for skew of the data pattern printed on the card.

Another problem is accurately activating data sensors only when they are positioned in proper reading relation to the data bit areas for accurately reading the data. In other words, data sensors located near the edge of a data bit during a read time may be confused as to whether the data bit is black or white.

Another general problem is designing a data reader which is capable of accurately reading closely packed data. This is important so that a large amount of data may be packed onto a relatively small sized card.

Still further problems, especially important for aircraft applications of data card readers, is to minimize the duty cycles and on-times of data sensors, wherein the chance of failure due to overloading light sources for illuminating data bits is small.

Typical prior art card readers are shown in U.S. Pat. No. 3,463,930 to West; U.S. Pat. No. 3,496,340 to Ryer; U.S. Pat. No. 3,553,437 to Boothroyd; U.S. Pat. No. 3,573,436 to Berler et al.; and U.S. Pat. No. 3,600,557 to Zappia. An additional prior art card reader is the RCR–2 card reader manufactured by the Republic Electronics Systems, a division of Republic Corporation, Chattsworth, California 91311.

The West card reader is designed to read cards of the punched hole type. The cards are inserted into a passageway with one edge of the card butted against a fixed side wall. A series of adjustable stops engages the other side of the card to position it in the passageway for feeding therethrough with a minimum amount of skew. The card is pulled through the reader manually, and the read mechanism is activated by a mechanical finger disposed in the passageway. West's card reader suffers from several difficulties. First, there is no compensation for the situation wherein the data pattern is skewed with respect to the edge of the card. Second, because the card is manually pulled through the reader, the speed is uneven and there is a possibility that the alignment of the card against the fixed side wall will not be retained throughout the passage of the card, either because the mechanical stop mechanism defining the width of the passageway may not be precise permitting some sliding of the card within the passageway or because the card itself may be deformed by the uneven forces in pulling the card through the reader by hand.

The record handling apparatus of the Ryer patent also contemplates sliding the edge of a data card along a reference deck. However, Ryer recognizes that data may not by precisely placed on the card with respect to the edge of the card, and provides a first reference data track for determining the position of the data pattern on the card. Ryer provides a bank of sensors, some of which are used to determine the position of the reference track, and others of which are a fixed distance from the sensors locating the data track, selected ones of the others activated depending on the position of a reference data track. Ryer thereby insures that the proper sensors are activated for reading the data. This system requires a large bank of sensors to read a small amount of data, and it is therefore not possible to read data packed densely onto data cards with this system. Further, Ryer's correction is primarily for displacement of data from the edge of the card, and does not account for skew of data, as would be necessary if a long string of data was to be read.

The Boothroyd optical label reading system and apparatus is designed for reading data printed on large passing objects, such as freight railroad cars or shipping boxes. Accordingly, the Boothyroyd system necessarily incorporates a skew alignment and data alignment means because no accurate positioning of the data with respect to the scanner is possible. Boothroyd's approach is to optically read the label and preserve an image thereof, and to thereafter scan the image with a televisoin-type raster. Again, data density is limited because several scanners are required for each line of data.

Apparatus for reading tickets disclosed in Berler et al. comprises a fixed width track having flanking vertical sides and roller means disposed within the track for pulling a coded card therethrough. The data on the card is illuminated by a single light source, and a plurality of light sensors is positioned over each data track. The alignment of the data card in the track is not precise, as the card may butt against either edge of the track. Compensation for the probable misalignment is made by spacing the data bits quite far apart.

The data scanner disclosed by Zappia provides means for pulling a sheet of paper having data imprinted thereon through a path under a traversing read head. The sheet of data is aligned with a fixed side wall of the apparatus, and the traversing data read head moves at right angles thereto. No means for correcting skew of data with respect to the edge of the data sheet are provided.

The Republic RCR–2 card reader also provided a fixed side wall for aligning the edge of a data card. The data card was biased against the side wall by a resilient leaf spring positioned against the opposite edge. A capstan drive roller offset from the center of the data card away from the guide side wall engaged the data card and pulled it about a cylindrical surface to position the data on the card under a read head. No adjustment to square the read head with the guide side wall was provided. The data cards were provided with a servo track adjacent to a marginal edge thereof, which track was printed with the data and therefore were not skewed with respect to the data. A generally transversely movable read head comprising a plurality of light sources and light responsive elements was positioned above the path above the data card and separated from the surface of the data card. One light source and sensor was positioned above the edge of the servo track. If the servo stripe moved from its position under this light sensor causing a change in the signal received by the light sensing element, a servo motor was activated to move the read head transversely until the light source and sensor were again positioned above the edge of the servo track. This was designed to keep the read head at a correct relative position with respect to the data printed on the card regardless of whether that data was misaligned with respect to the edge of the card or whether the card moved. The read head "hunted" prior to the card appearing under it, despite printing of a simulated servo stripe on the chassis. If the sensor was in all black or all white area when the card appeared, the single sensor means was not able to indicate the corrective direction, and the motion of the read head was therefore an unpredictable, hunting motion, sometimes increasing the error of position, and sometimes not providing a stable aligned relative position of the read head and data card or providing such a position only after the card had passed partway under the read head.

The data on the cards was arranged in columns and rows, one column being read at a time. A very narrow timing mark was positioned centrally with respect to each column, there being a row of such timing marks. The data reading sensors were activated for each column when the timing mark was sensed. The timing mark was made very narrow so that it was small with respect to the data, and further was positioned centrally with respect to the data so that reading would not occur until the read heads were approximately in the center of the data. However, because the timing mark was very narrow, it was possible to miss the timing mark, and further because the read head was positioned a distance above the card, enough scatter and deflection were present that reading was often initiated either early or late for the data column. Making the timing mark larger to insure detecting it would only create more unprecise coordination of data reading and read head positioning.

Also, because the date head was positioned at a distance above the card, the ratio of response between black and white data bits was approximately 3 to 1, or 4 to 1 for very high quality data cards. Spaces remained between the data bits to minimize cross talk between the data currently being read and the adjacent data either entering the read area or leaving the read area. This ratio was not high, and it was difficult to separate data responses from current leakage in the phototransistor sensors.

The data cards were designed with 32 rows of data arranged in columns. The data sensors were pairs of light emitting diodes and photo-transistors. Reading was accomplished by turning on eight adjacent light emitting diodes at one time and serially activating the corresponding eight photo-transistors wherein a serial output of the data was accomplished. However, the "on" time of the diodes thereby exceeded maximum standards for aircraft usage.

For the above reasons, the Republic RCR–2 card reader never resulted in a practical and acceptable card reader for aircraft usage.

SUMMARY OF THE INVENTION

OBJECTS OF THE INVENTION

It is an object of the invention to provide a data card reader.

It is another object of the invention to provide a data card reader which is extremely accurate.

It is an additional object of the invention to provide a card reader which compensates for skew errors in the printing of data cards.

It is a further object of the invention to provide a card reader which will accurately read a data card having a high density of data thereon.

It is yet another object of the invention to provide a card reader which is automatic.

It is a still further object of the invention to provide a card reader wherein the elements have long life.

It is an additional object of the invention to provide a card reader which indicates if it is not operating properly.

It is yet another object of the invention to provide a card reader which is small, rugged, and also otherwise meets requirements for airborne use.

It is an additional object of the invention to provide a combination of a data card and a data card reader for accomplishing the above objectives.

Other objects of the invention will in part be obvious and will in part appear hereinafter.

GENERAL DESCRIPTION

The invention herein generally relates to a data card reader. The data cards to be read have a data format arranged in columns and rows with the initial two columns devoted to a predetermined error check data pattern to be read for determining if the card reader is functioning correctly. A row of timing marks is provided with one timing mark for each column of data, and the leading edge of each timing mark is positioned midway with respect to the data bits in the associated column. The data card further includes a black servo stripe printed parallel to the rows of data along one edge of the card, and two additional black stripes, one at the leading and one at the trailing edges of the card wherein a transition from black to white at the termination of the leading edge stripe activates a data read capability, and a transition from white to black at the trailing edge stripe subsequently deactivates the data read capability. Therefore, data read capability is created only while the data card is under the read head, and the edge of the card cannot be misinterpreted as a timing mark.

The data reader according to the invention comprises a housing having one side positioned as a guide for an edge of the data card generally parallel to the servo stripe printed thereon. The data reader further comprises an entry-exit slot protected against moisture and dust intrusion by a gasket and guide means defining a card path directing the card in a generally teardrop-shaped path within the card reader. An elongated leaf spring is positioned beside the path of the card opposite the guide side urging the card against the guide side.

A capstan roller is positioned adjacent to the path of the card, and engages the card to propel it through the card reader at a uniform rate of speed. The capstan roller is offset toward the guide side of the path, wherein the force of the capstan roller also urges the card against the guide side. This is different from the arrangement of the capstan roller in the Republic RCR–2 card reader, which was oppositely offset and tended to pull the card away from the guide wall. The offset position of the capstan roller toward the guide wall is an improvement which causes the card to be always held against the side wall guide edge, and therefore results in a better, more accurate card reader.

A read head is installed in the housing of the data card reader for transverse sliding moving with respect to the side guide edge. The read head is comprised of an L-shaped aperture plate having three elongated mounting slots. One of the slots is positioned over a cam, and the read head is adjusted transverse to the side wall by means of the cam. The position of the cam is secured, and thereafter the slots function to permit the tansverse sliding movement of the read head. The provision for adjustable mounting of the read head wherein it can be aligned transverse to the side wall is an advantage in that the side guide edge and mounting support for the read head need not be accurately relatively positioned wherein manufacturing tolerances can be relaxed and cost reduced.

The read head further includes a drive plate having a slot which is positioned parallel to guide wall edge. A cam is mounted therein for driving the read head transversely to the guide edge.

The read head aperture plate has mounted therein a plurality of data sensors comprising light emitting diodes and photo-transistors in sets of one each. Each set of light emitting diode and photo-transistor is focused on a rectangular aperture in the bottom of the aperture plate, which is positioned for contact with the data card as it passes through the card reader. There are a plurality of apertures and data sensors deployed in a straight line across the aperture plate transverse to the side guide edge. The light emitting diodes and photo-transistors are appropriately screened to prevent unwanted crosstalk. Thus, the viewing area of the photo-transistors is defined and limited to a data bit, and interference from other light emitting diodes is eliminated.

The rectangular opening increases the area of the data card exposed to the data sensors, while minimizing the dimensions of the opening. Therefore, there is greater margin for error in positioning the aperture with respect to a data bit, and the accuracy with which the card can be read is increased. Further, the rectangular apertures cause a more rapid response by the data sensors in comparison to round apertures. For instance, when a data bit is one fourth of the way into the aperture, 25 percent of the area of the data bit is exposed for viewing, wherein when a data bit is one quarter of the way into a circular aperture, less than 25 percent of the area of the aperture is read. This is particularly significant for the aperture positioned over the timing track, wherein the transition from light to dark is used to activate a data read sequence.

Two of the read head apertures and sensors are positioned approximately above the edges of the servo track of the data card and spaced apart by the width of the servo stripe. The outputs of the two photo-transistors of the sensors are connected through a differential amplifier and power amplifier to drive a second order servo position feedback servo which is critically damped, the servo driving the cam laterally positioning the entire read head assembly over the data card. This arrangement adjusts the position of the read head above the data card such that the output of the two photo-transistors is balanced, indicating that the two apertures are positioned precisely flanking the servo stripe. In this position, the remainder of the apertures are positioned precisely over the data rows and timing marks on the data card. If a skew of the data on the data card is present with respect to the edge of the data card, the output of the two photo-transistors above the servo track will become unbalanced, wherein the servo motor drives the cam to reposition the read head such that the output of the two photo-transistors is again balanced. Thus, there is continual adjustment of the position of the read head with respect to the card data such that the apertures of the read head are always positioned precisely over the data printed thereon.

The previous means for positioning the read head comprised a single photo-transistor and light emitting diode positioned over the servo stripe. This arrangement was inferior because a relatively large error could occur prior to the card reaching the read head. Thus, the motion of the read head was often a hunting, unstable motion, sometimes not resulting in a stable corrected position, and sometimes with unacceptable delay in reaching a correct position.

The light emitting diodes are associated with the data read function and are turned on in groups, in the embodiment disclosed, in four groups of eight for reading 32 rows of data bits. However, the groups of eight are comprised of first the first, fifth, ninth, etc. light emitting diode; then the second, sixth, tenth, etc. light emitting diode; then the third, seventh, eleventh, etc. light emitting diode, and the like. Data is gated out serially from data chips reading the output of the photo-transistors. Thus, each light emitting diode is on for only a short period of time followed by a long off period. Further, no adjacent light emitting diodes are simultaneously illuminated, decreasing any possibility of cross talk and minimizing heat sink problems. This is unlike the earlier Republic RCR–2 card reader wherein a group of eight adjacent light emitting diodes were turned on and left on while the corresponding eight data bits were read serially, resulting in an unacceptable consecutive on time.

When a card is inserted into the entry-exit slot of the data card reader, a beam of light between a light emitting diode and a photo-transistor is broken. The change in output signal of the photo-transistor is used to turn on the capstan roller and activate the circuits of the card reader, including a 7 second timer and a 25 second timer. The card is propelled through the card reader by the capstan roller at a rate of approximately 1 inch per second. When the data card reaches the read head, the servo sensors and servo motor cause the apertures of the aperture plate to be properly aligned with respect to the data on the card, and shortly thereafter the contrast sensor activates the data read circuitry. The predetermined error check pattern is read first, and if it is read correctly, the data is thereafter read and partially decoded by the circuitry of the card reader to provide the data output in ARINC 561 and ARINC 575 format.

If the predetermined error check data pattern is not correctly read prior to the seven second timer timing out, or if the predetermined error check data pattern is read incorrectly, an error signal is provided and data reading is inhibited.

The capstan roller continues to run while the 25 second timer times out, which is an adequate period of time for the card to be returned to the user from the card reader.

The invention accordingly comprises the several steps and the relation of one or more of such steps with respect to each of the others, and the apparatus embodying features of construction, combination of elements and arrangement of parts which are adapted to effect such steps, all as exemplified in the following preferred embodiment, and the scope of the invention will be indicated in the claims.

THE DRAWINGS

For a fuller understanding of the nature and objects of the invention, reference should be had to the following detailed description taken in connection with the accompanying drawings, in which.

Figure 1:
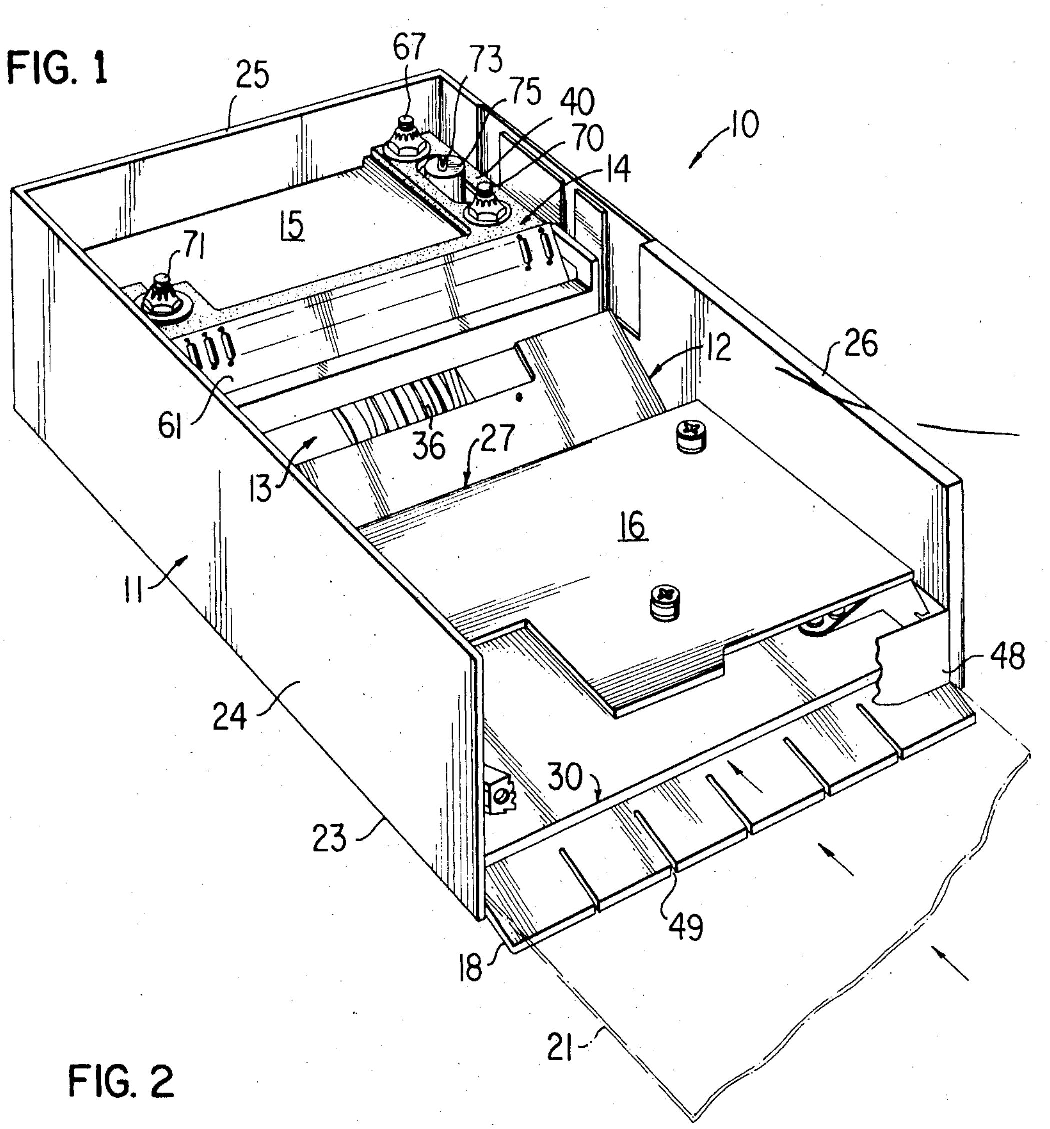
FIG. 1 is a perspective view of a data card reader according to the invention herein with the top and front panels removed.
Figure 11E:
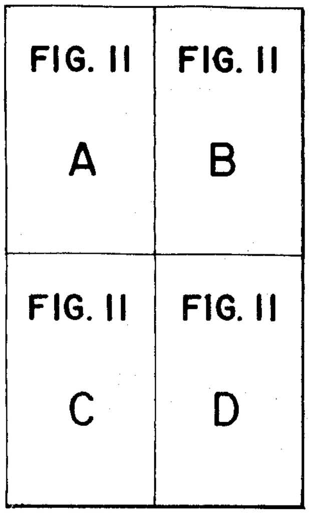
Figure 11A:
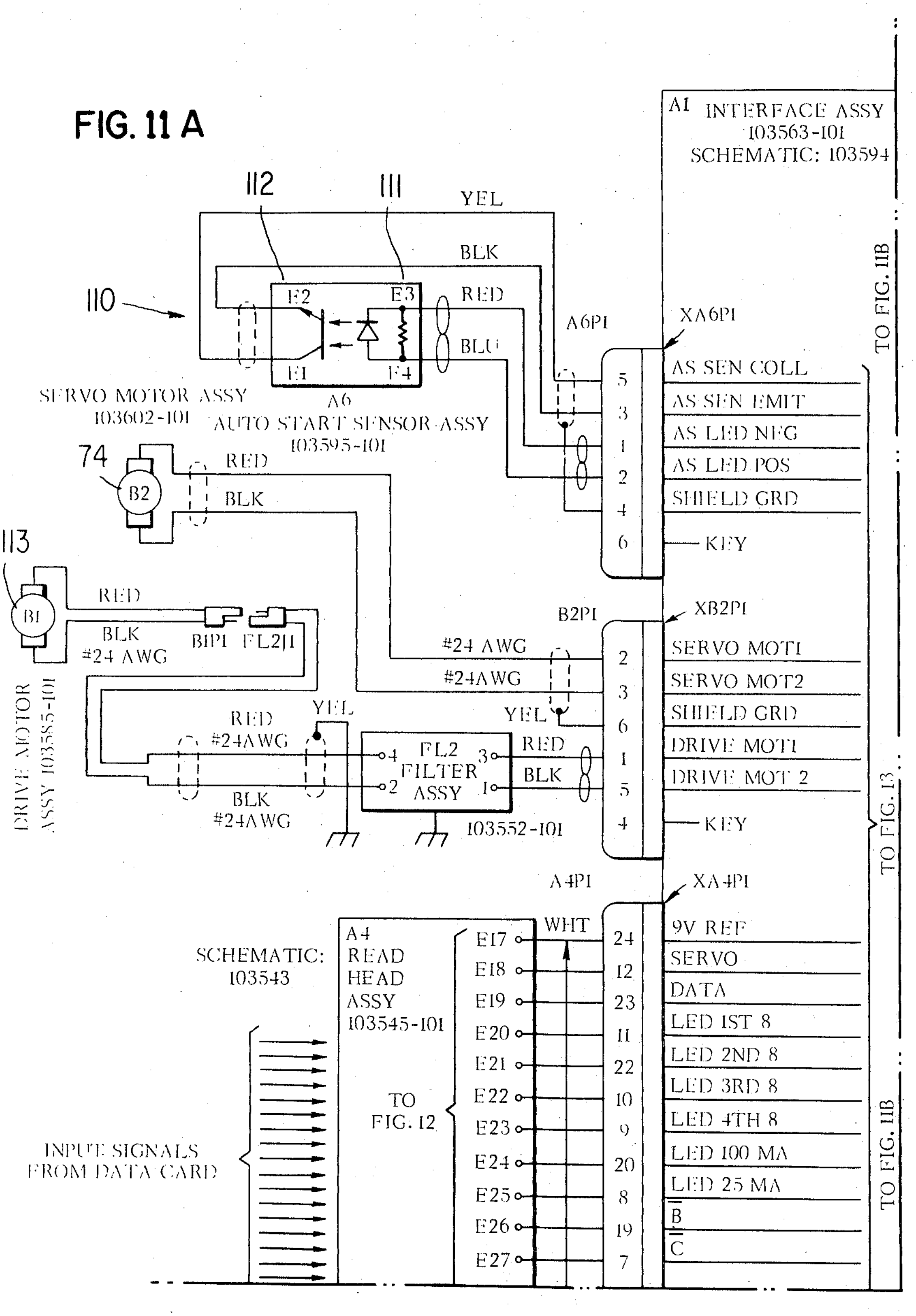
Figure 11B:
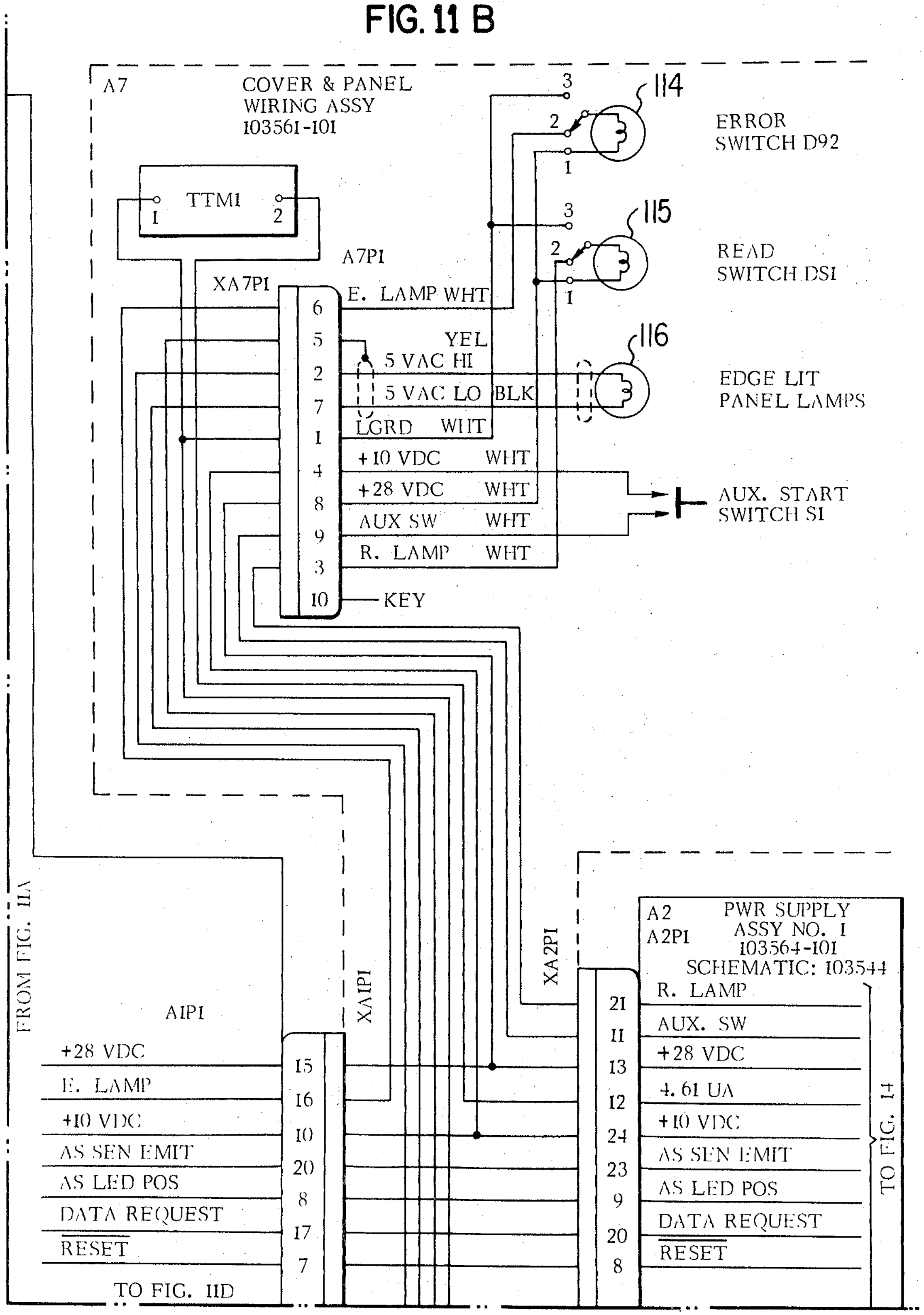
Figure 11C:
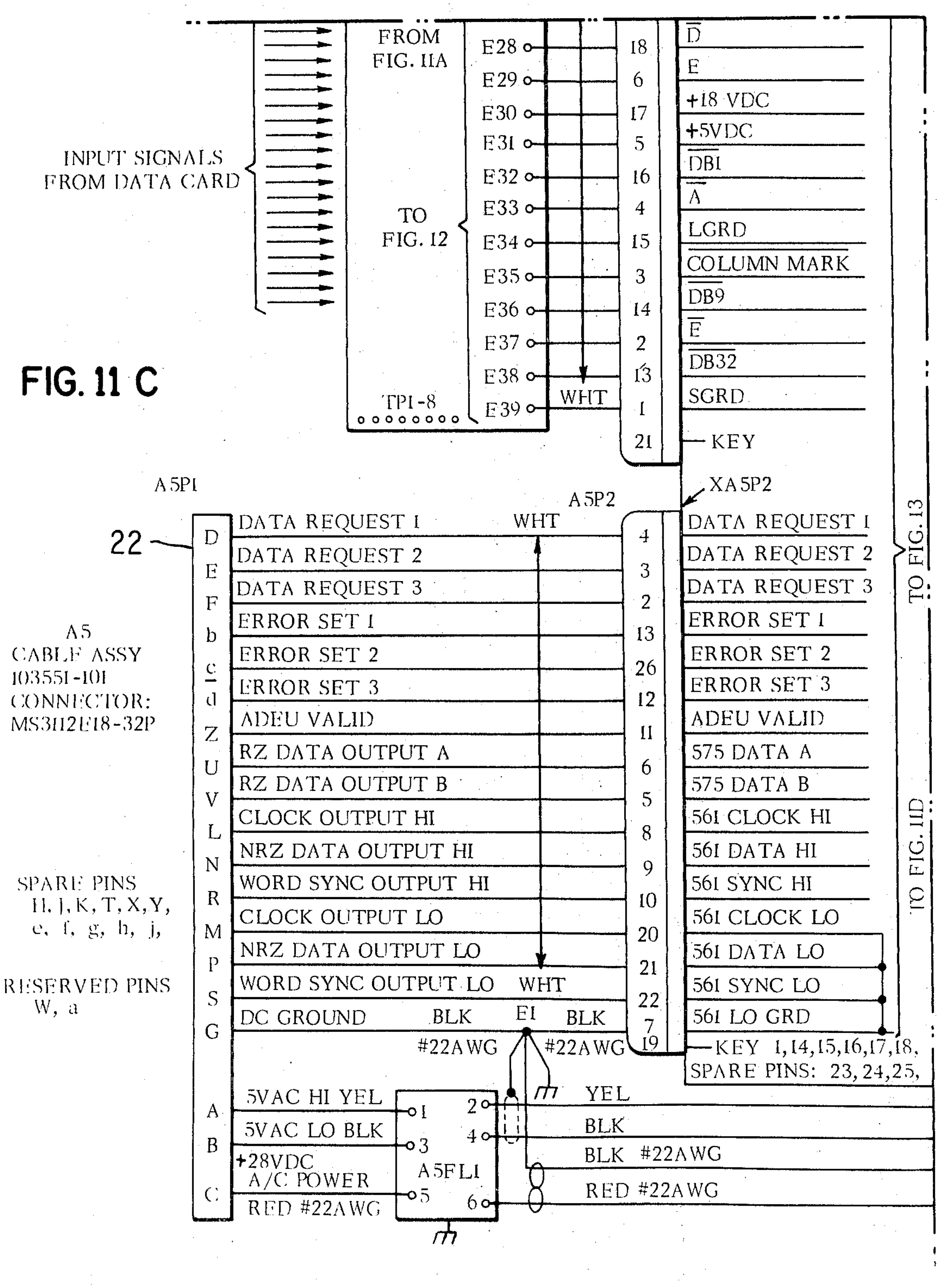

FIG. 11 consisting of FIGS. 11A–11D is a schematic diagram showing the interconnection of the electrical circuits of FIGS. 12–15 comprising the electronics card reader of FIG. 1;

FIG. 11A is a portion of FIG. 11;

FIG. 11B is a portion of FIG. 11;

FIG. 11C is a portion of FIG. 11.

Figure 11D:
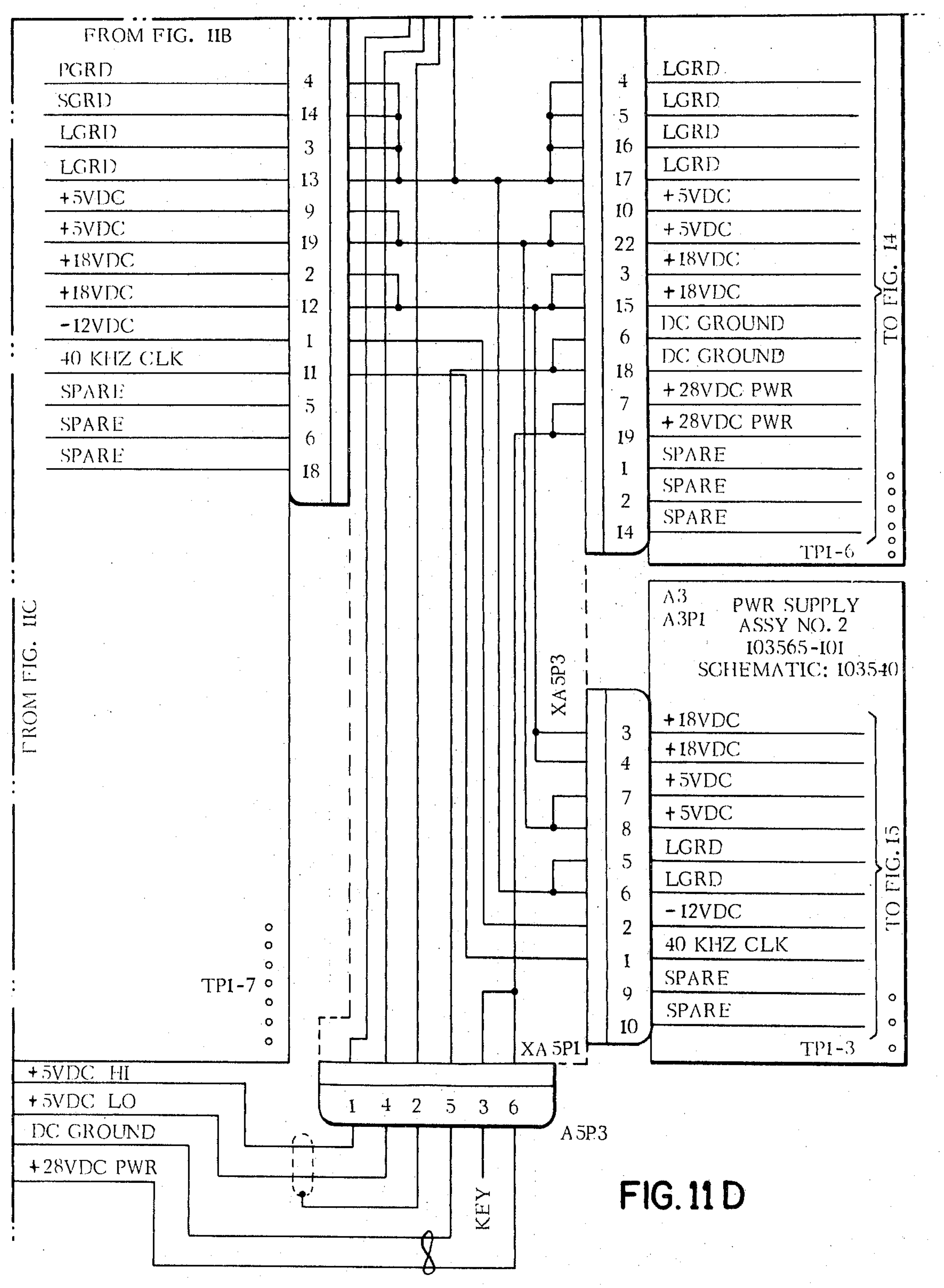

FIG. 11D is a portion of FIG. 11.

Figure 12D:
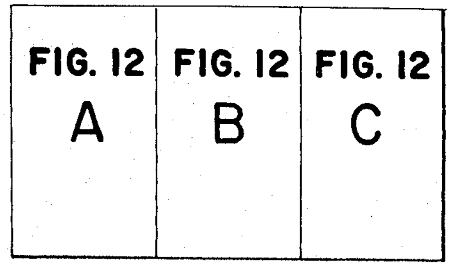
Figure 13J:
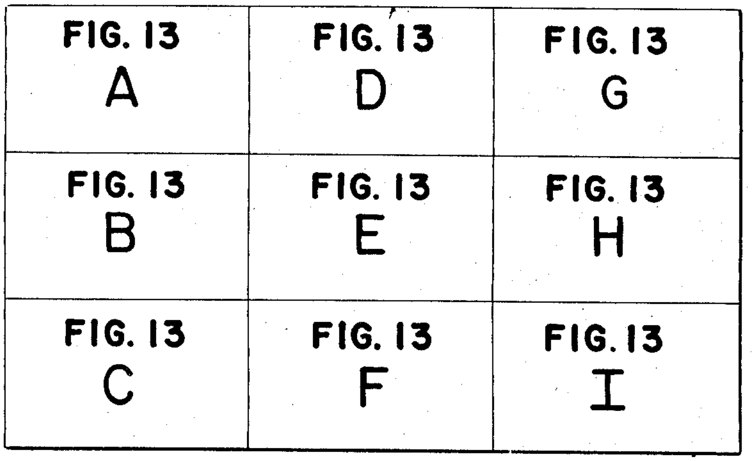
Figure 14C:
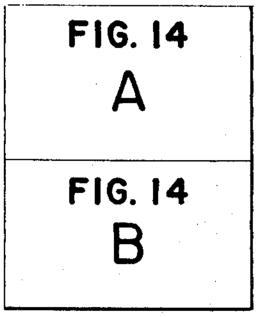
Figure 15D:
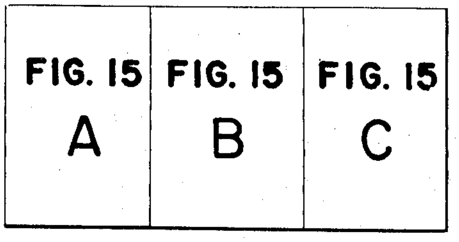
Figure 12A:
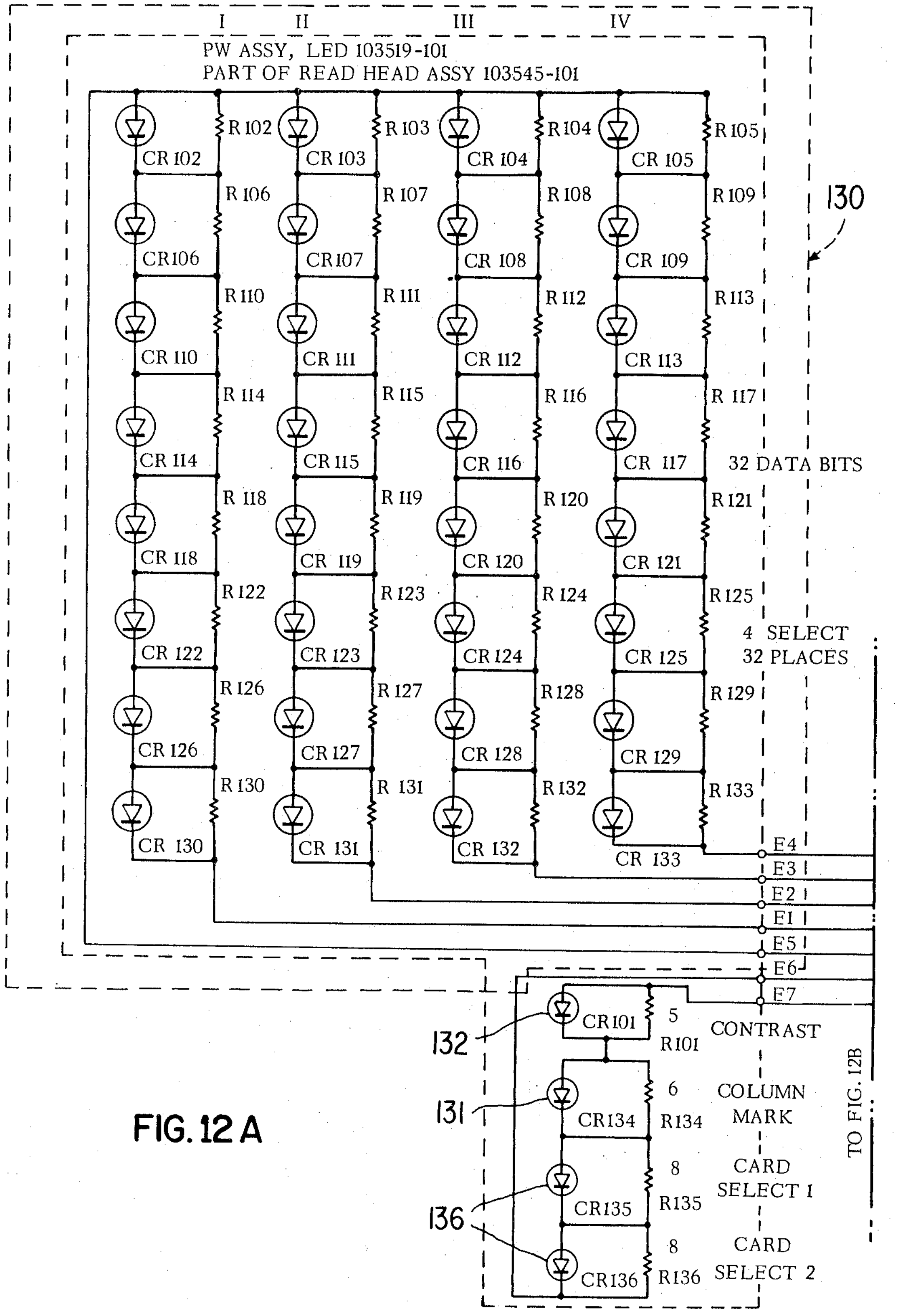
Figure 12B:
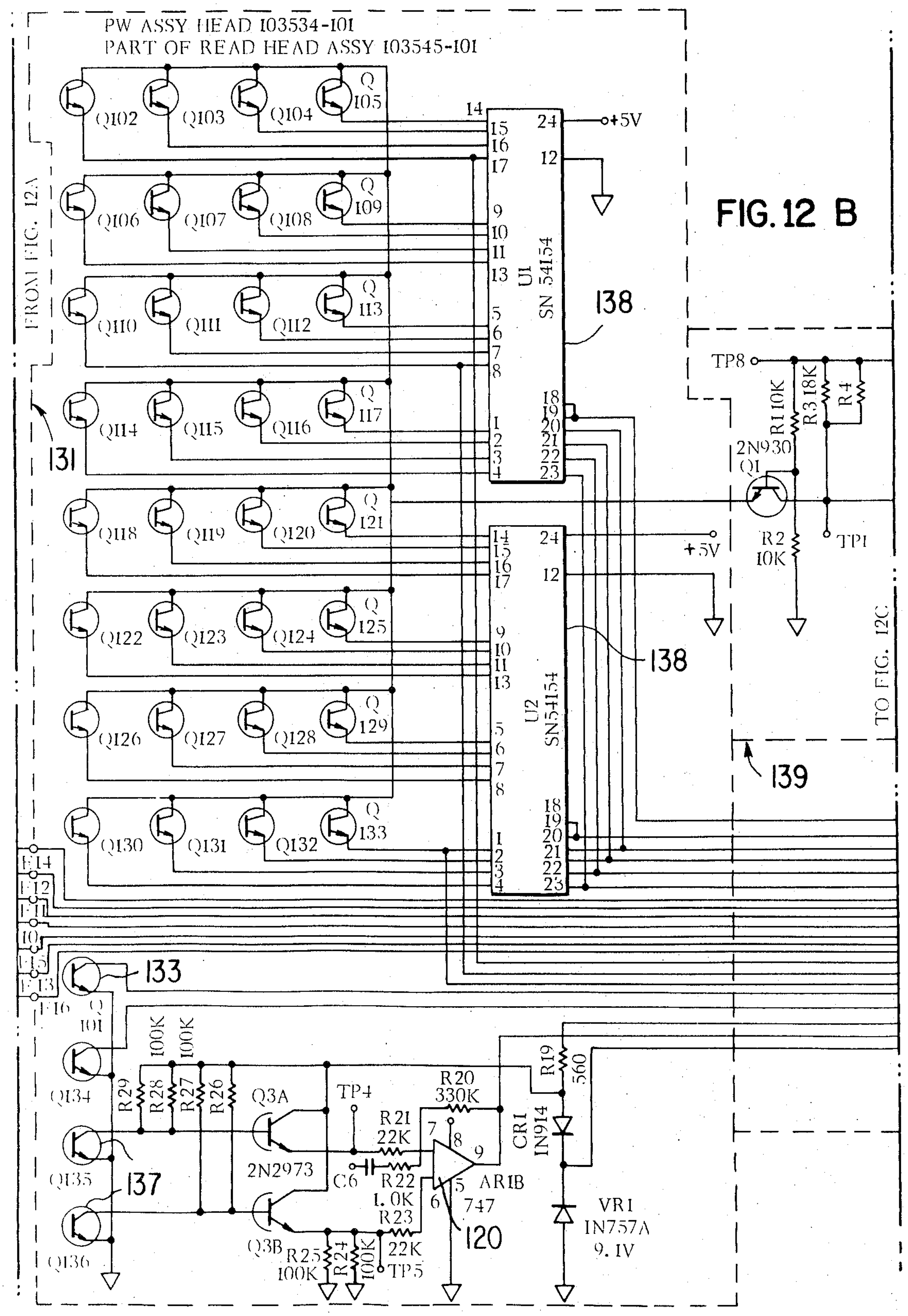
Figure 13A:
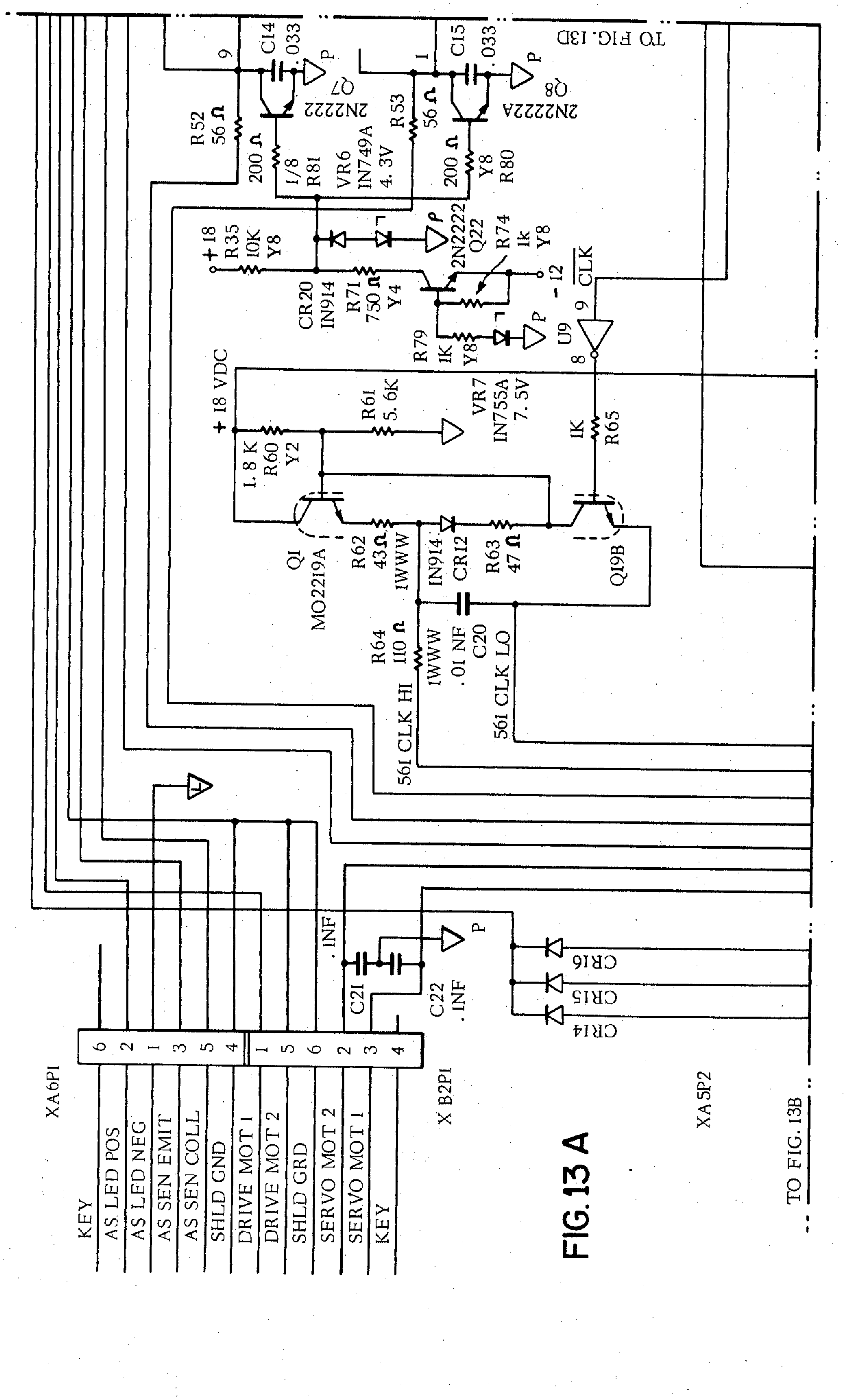
Figure 13B:
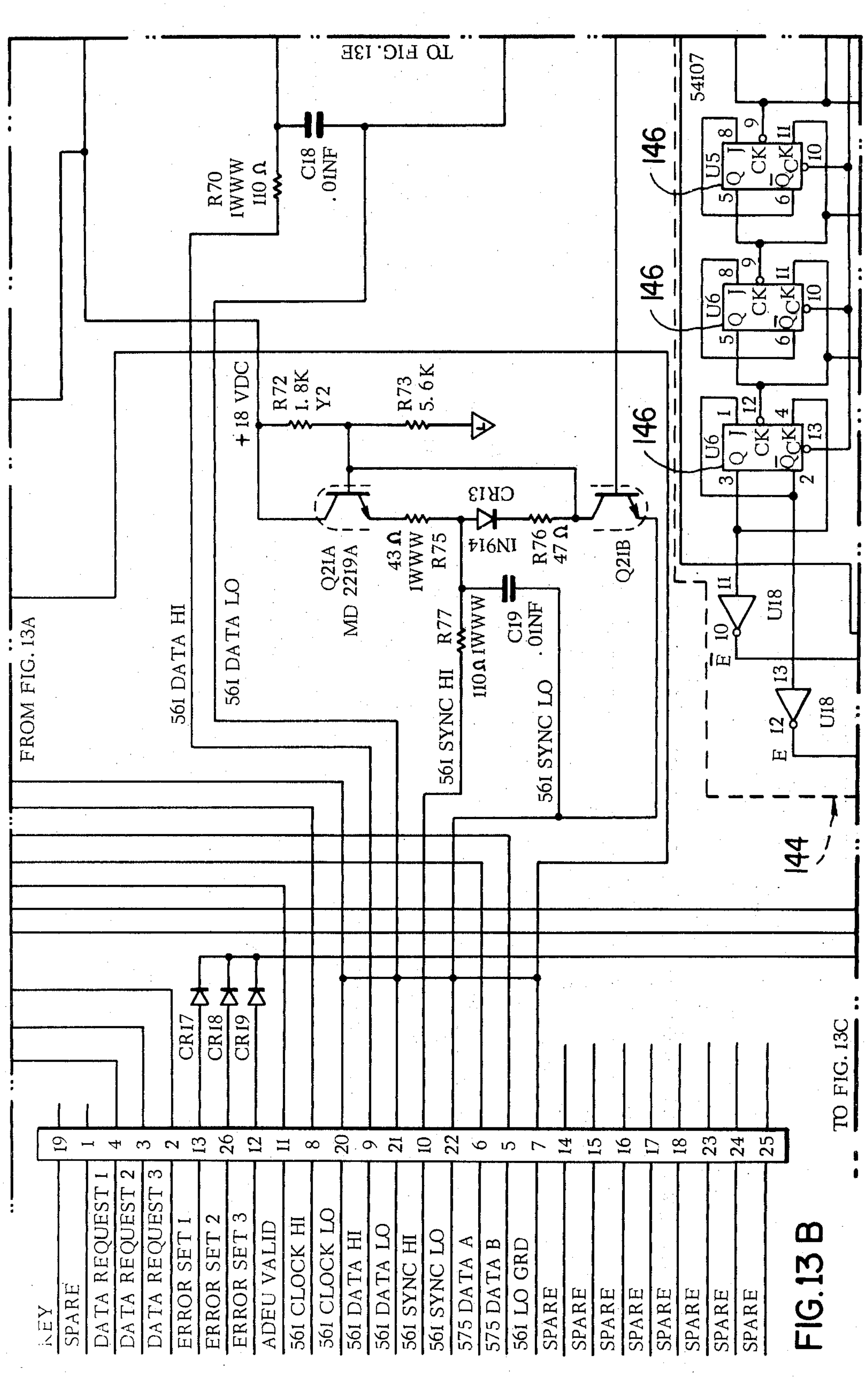
Figure 13C:
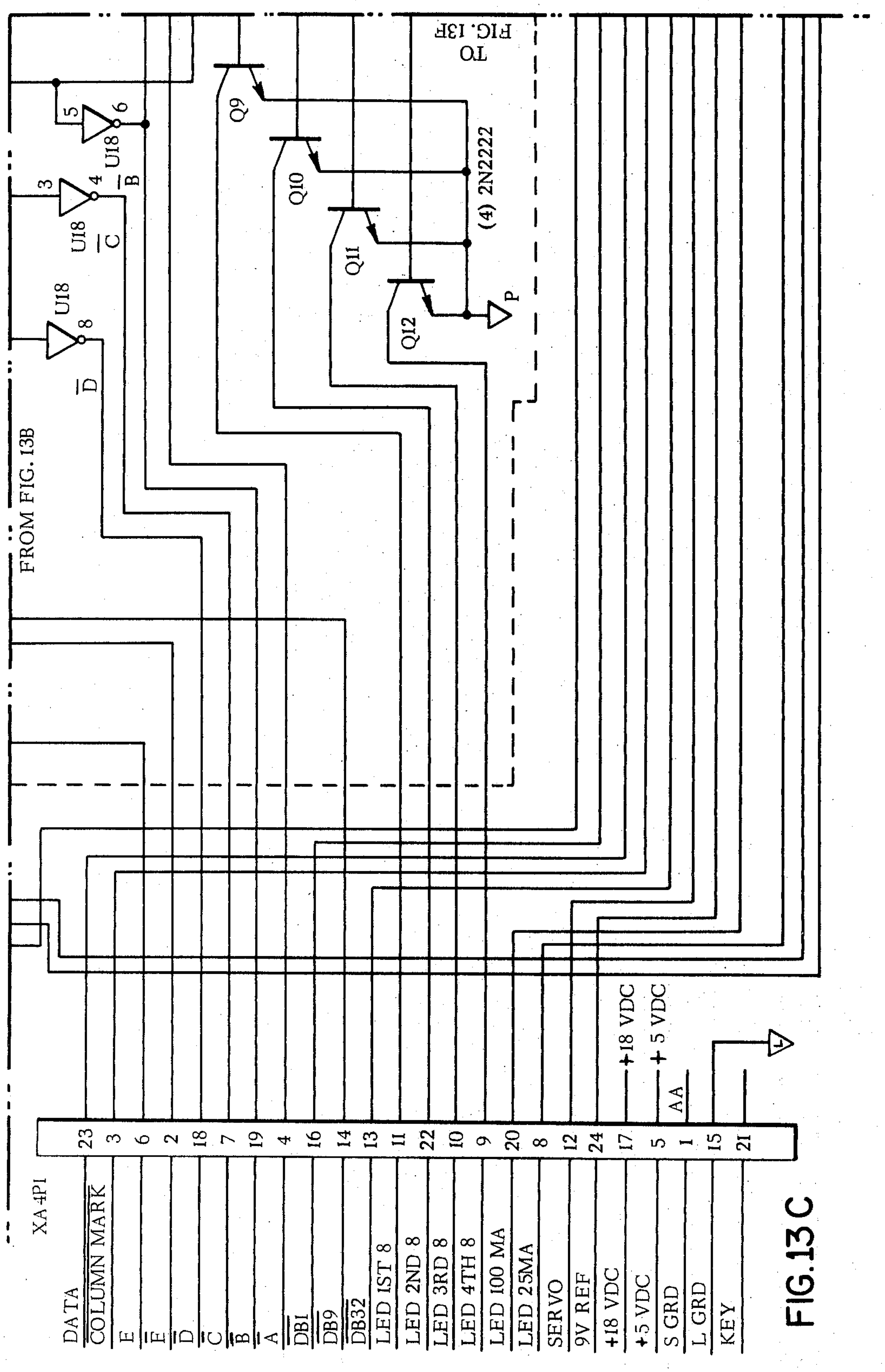
Figure 13D:
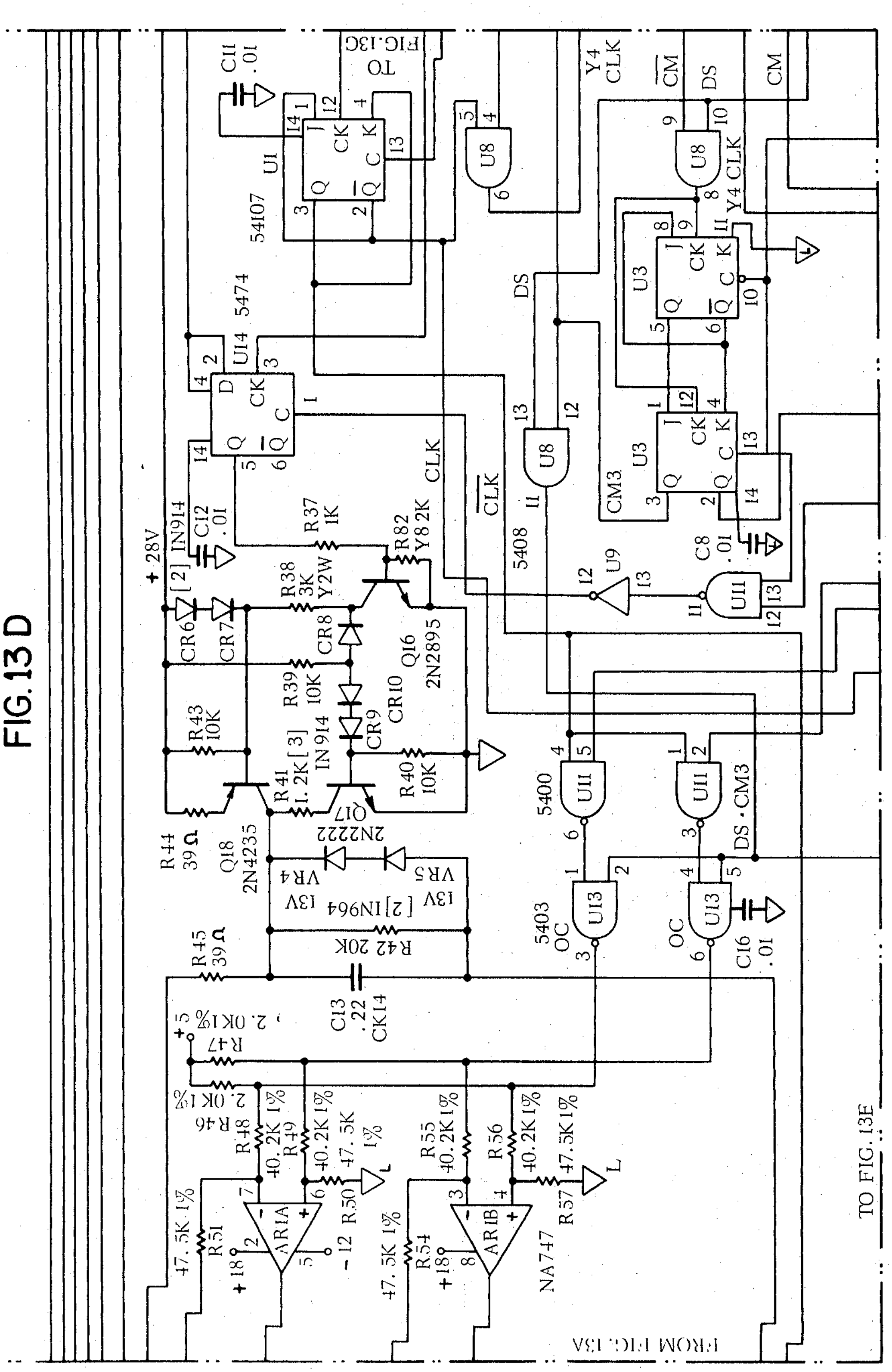
Figure 13E:
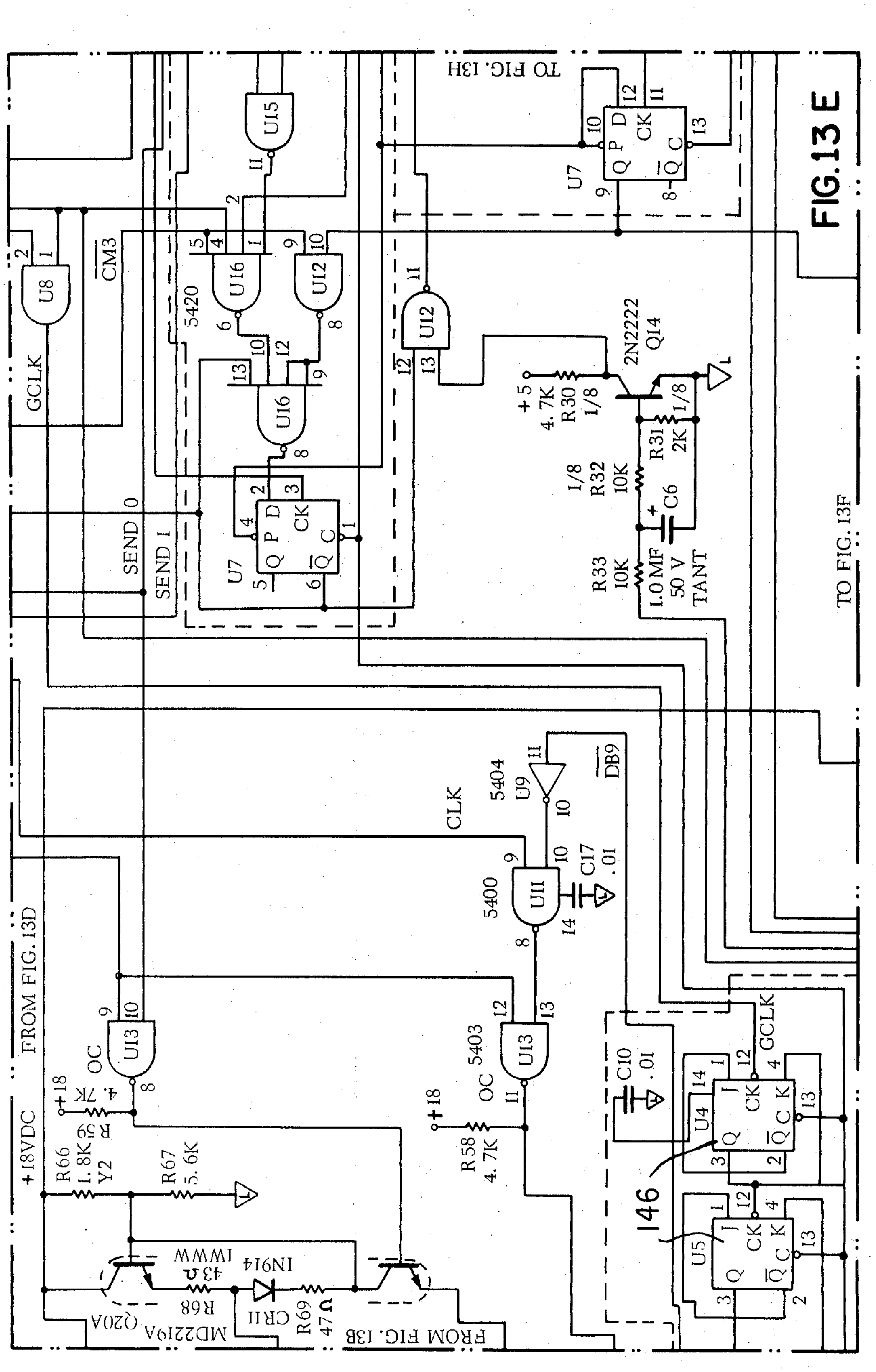
Figure 13F:
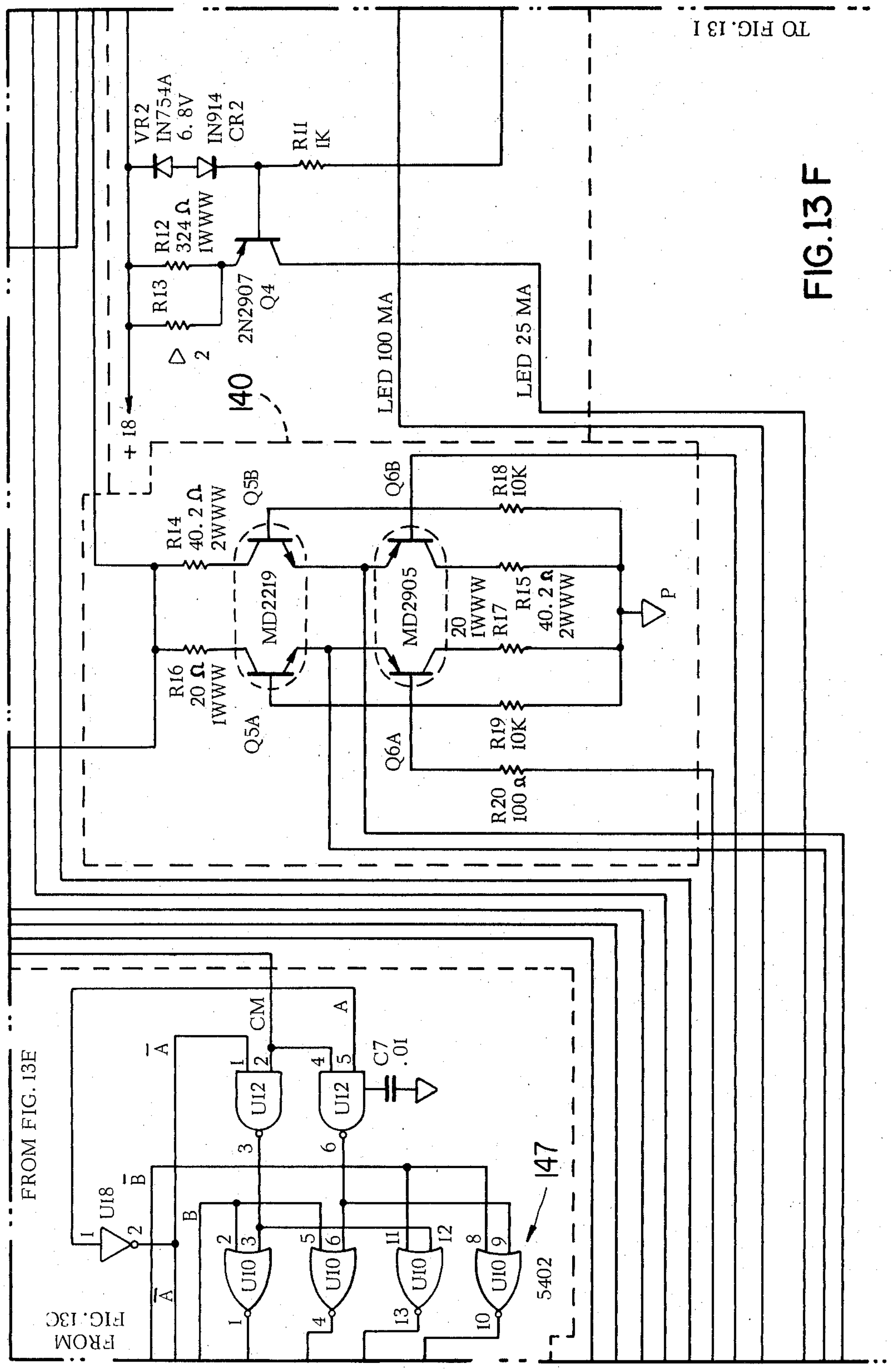
Figure 13G:
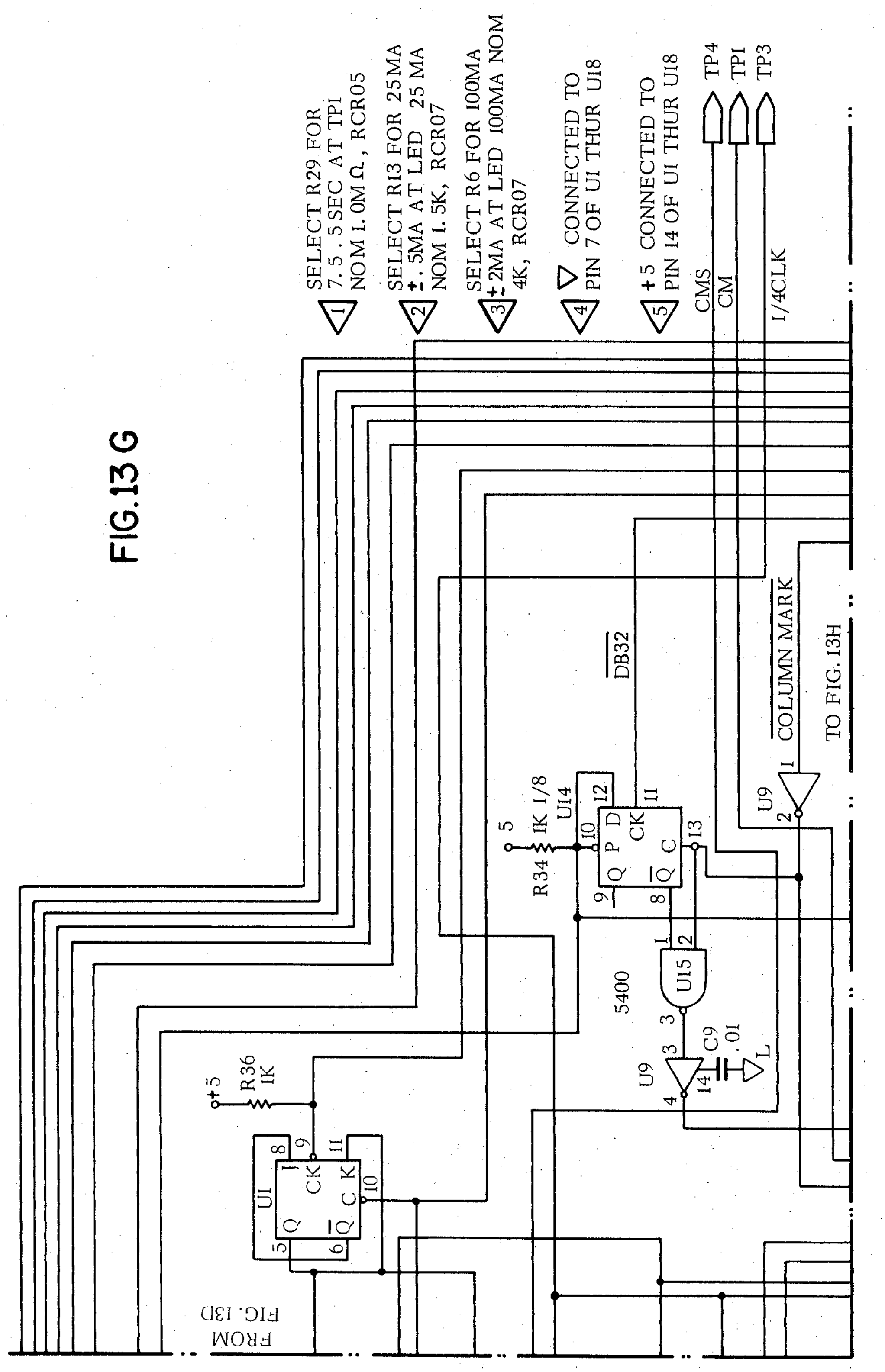
Figure 13H:
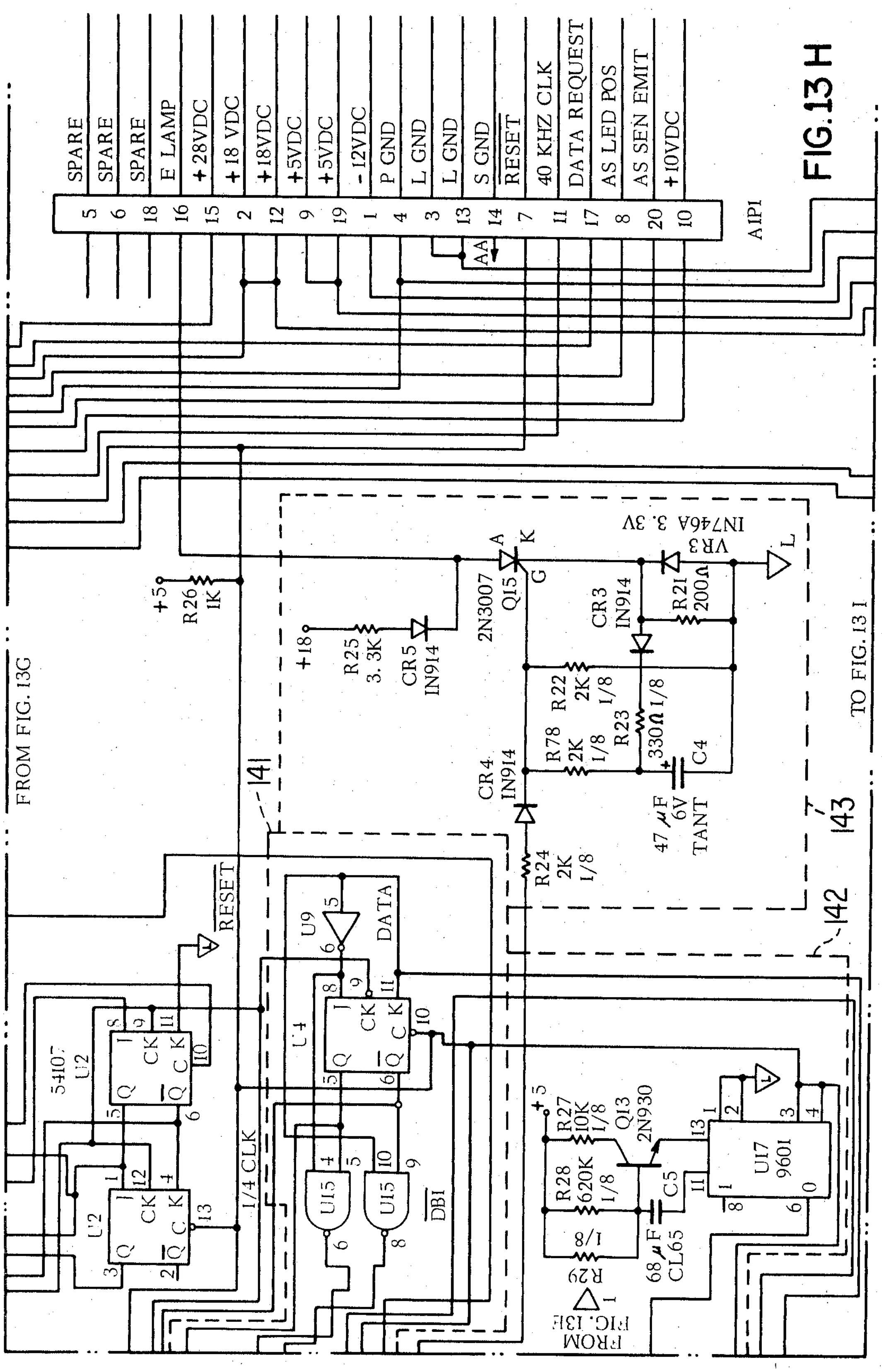
Figure 13I:
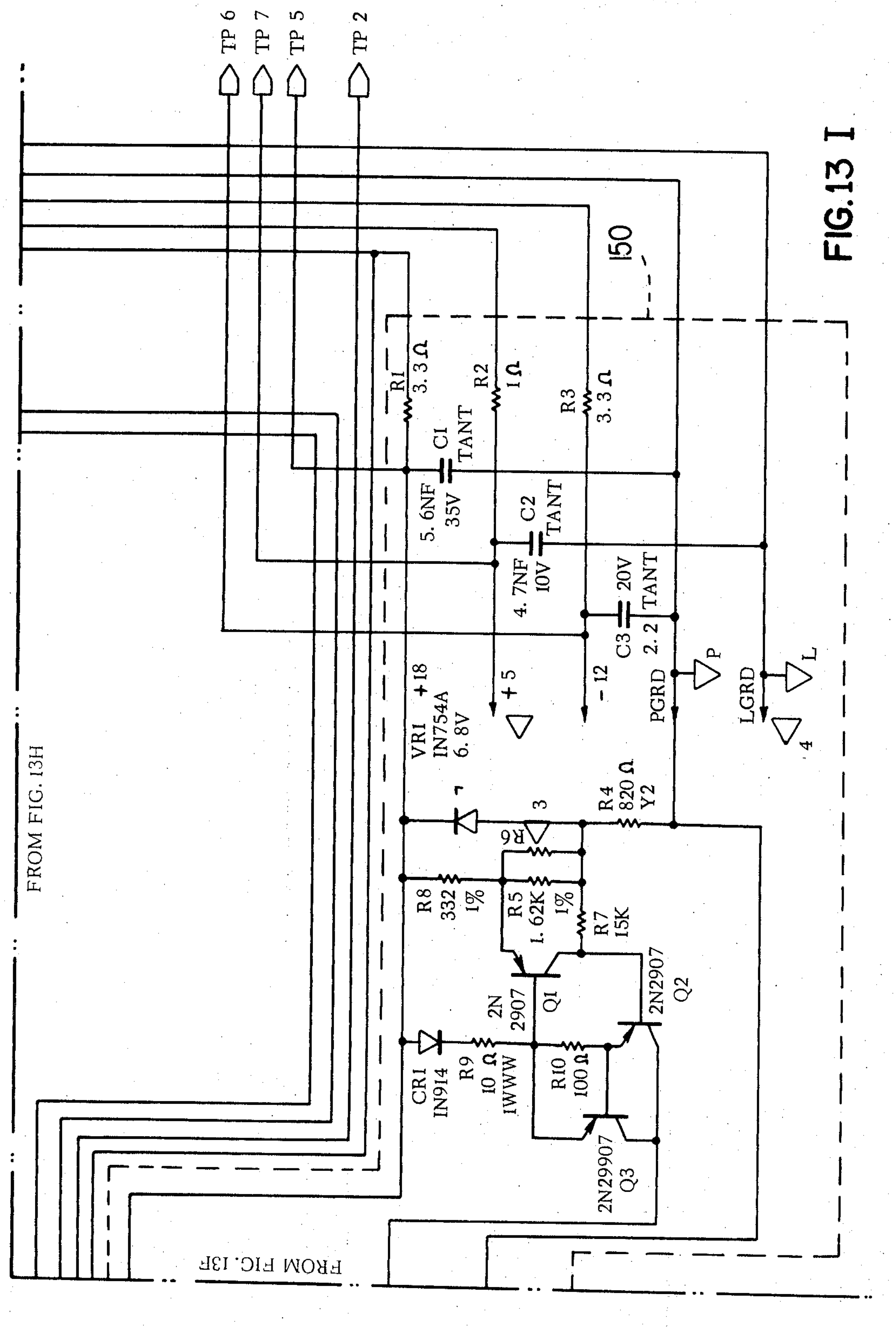
Figure 14A:
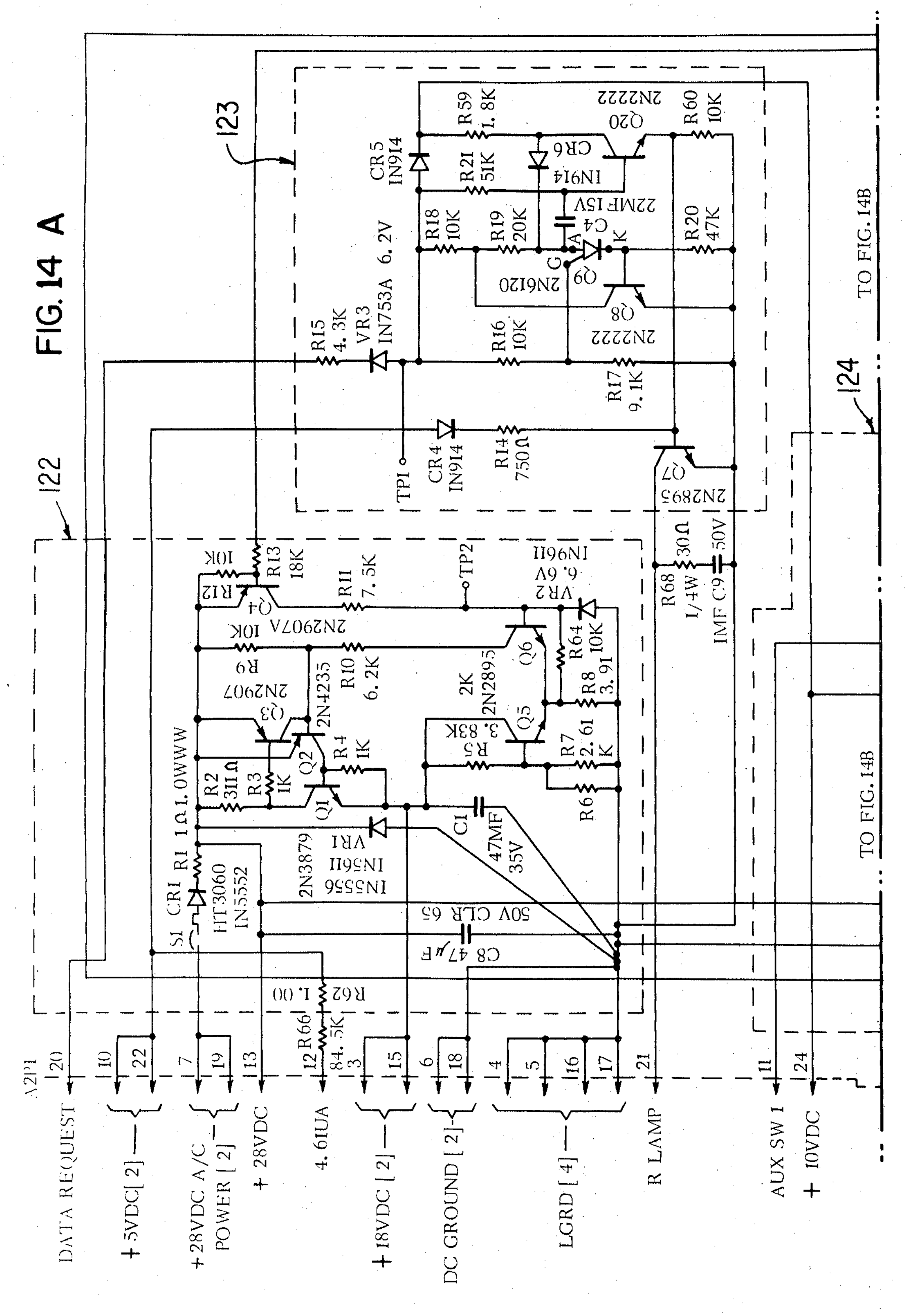
Figure 14B:
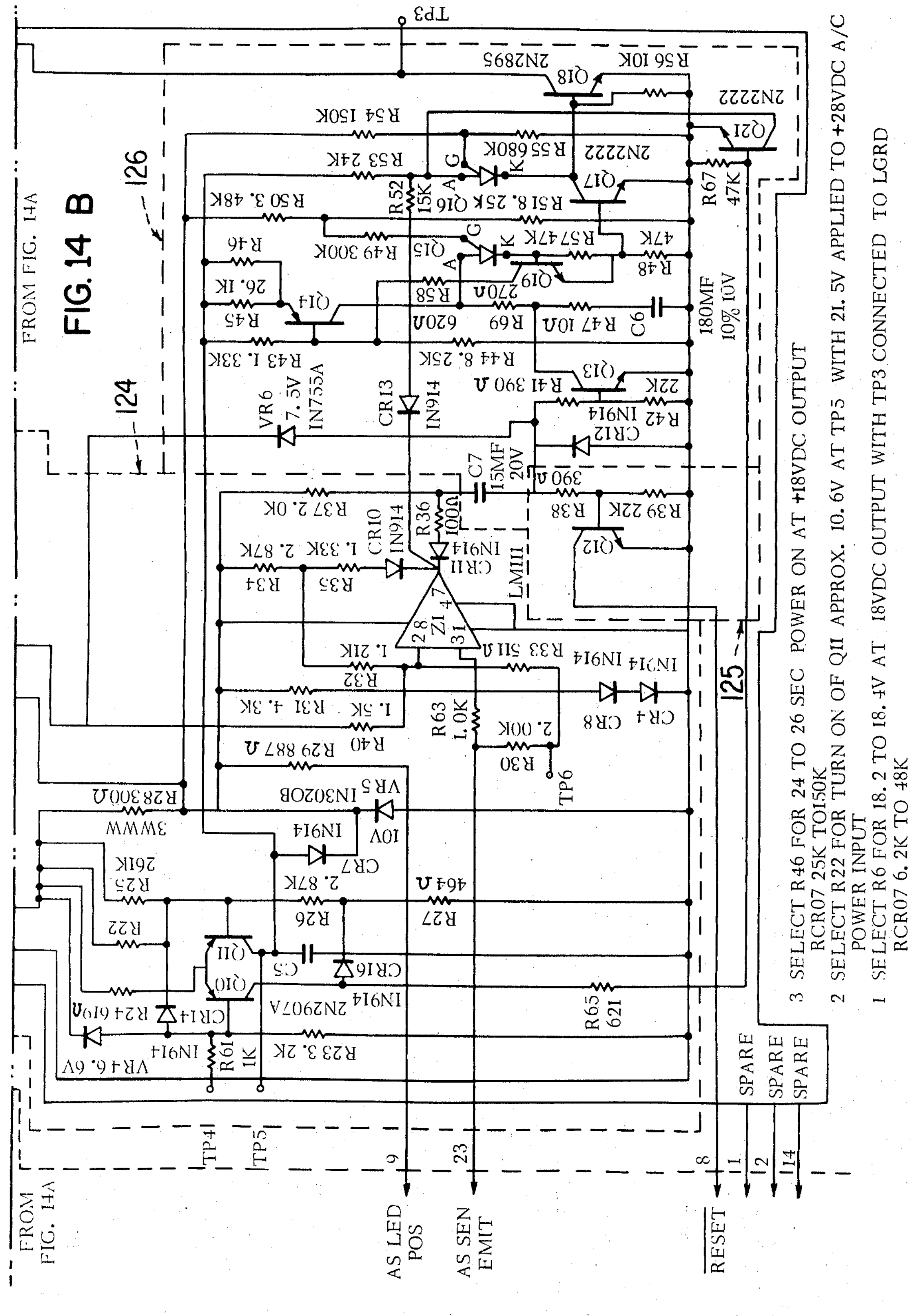
Figure 15A:
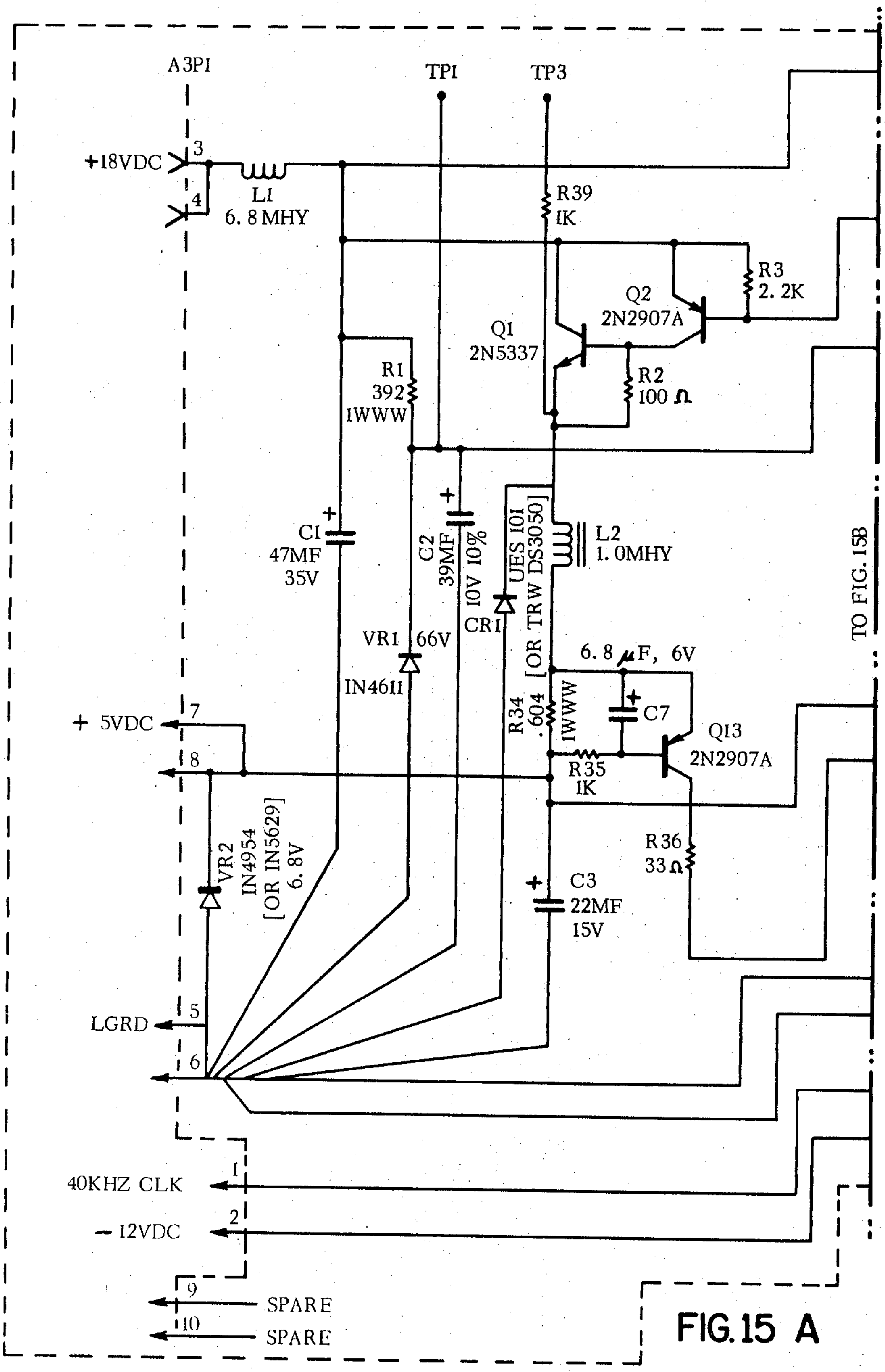
Figure 15B:
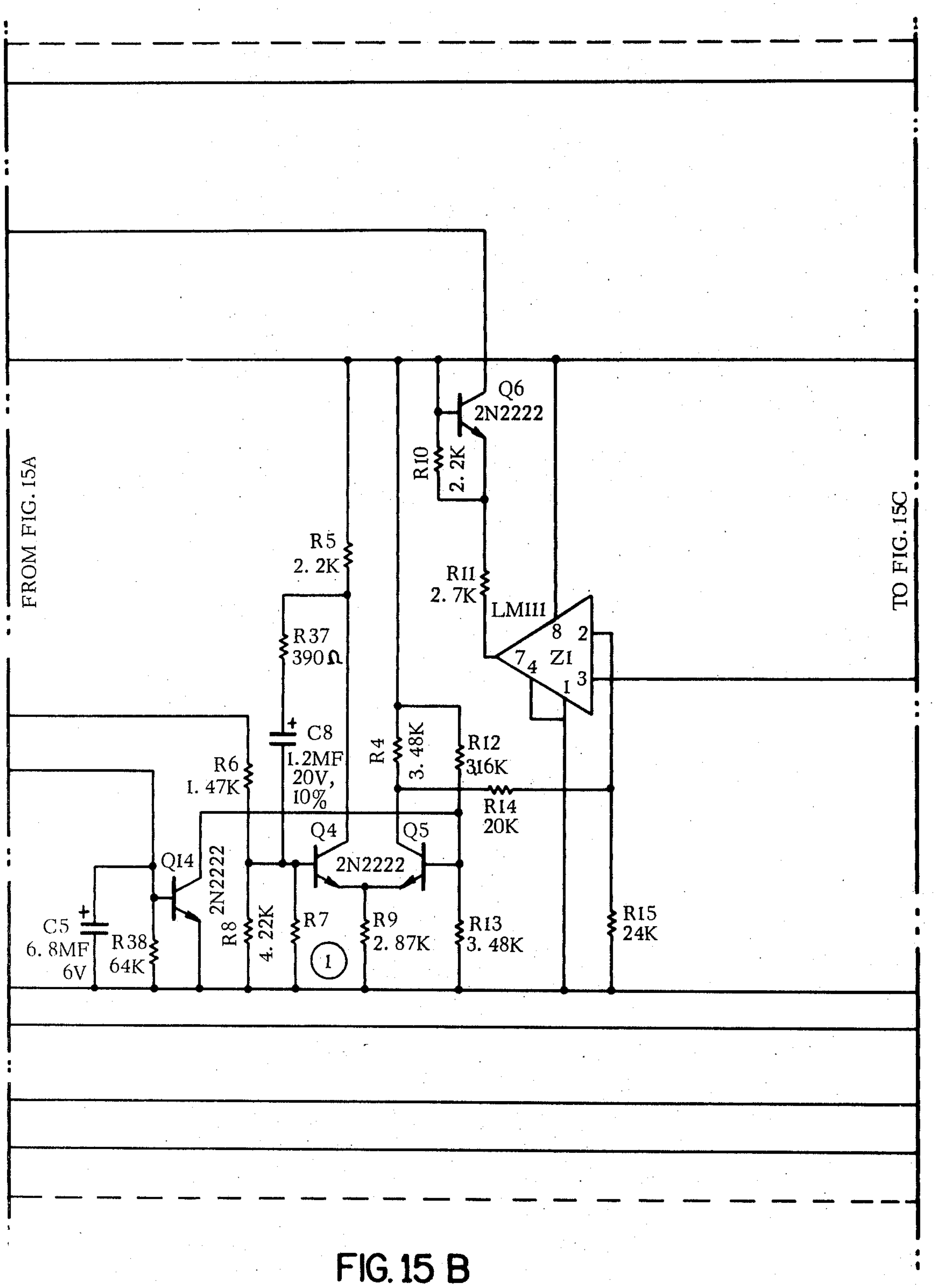
Figure 15C:
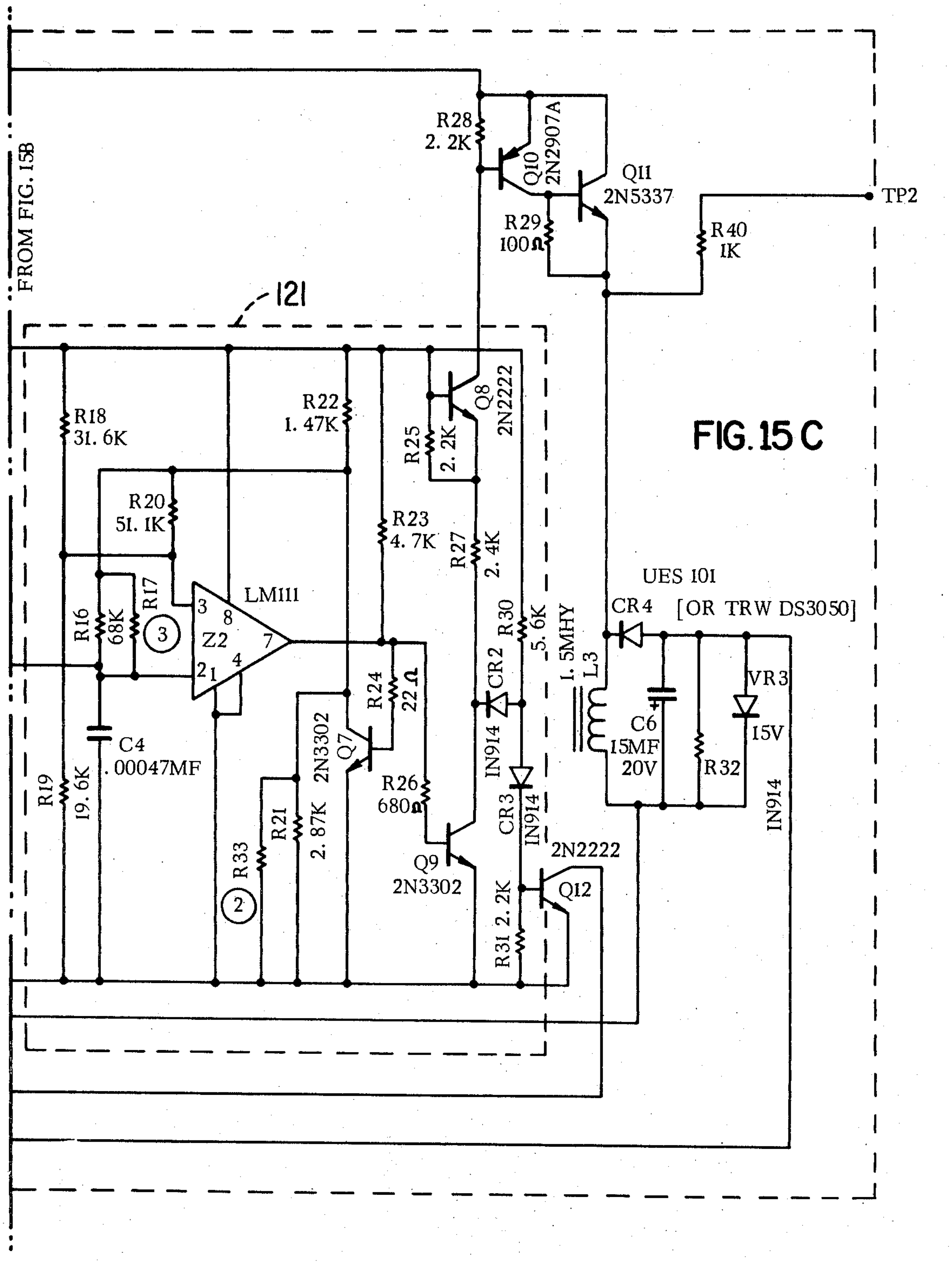

FIG. 11E is a diagram showing how FIGS. 11A and 11D are assembled to form FIG. 11;

FIG. 12, consisting of FIGS. 12A–12C, is a schematic diagram of a portion of the electrical circuit comprising the card reader of FIG. 1;

FIG. 12A is a portion of FIG. 12;

FIG. 12B is a portion of FIG. 12;

FIG. 12C is a portion of FIG. 12;

FIG. 12D is a diagram showing how FIGS. 12A–12C are assembled to form FIG. 12;

FIG. 13, consisting of FIGS. 13A–13I, is a schematic diagram of a portion of the electrical circuit comprising the card reader of FIG. 1;

FIG. 13A is a portion of FIG. 13;

FIG. 13B is a portion of FIG. 13;

FIG. 13C is a portion of FIG. 13;

FIG. 13D is a portion of FIG. 13;

FIG. 13E is a portion of FIG. 13;

FIG. 13F is a portion of FIG. 13;

FIG. 13G is a portion of FIG. 13;

FIG. 13H is a portion of FIG. 13;

FIG. 13I is a portion of FIG. 13;

FIG. 13J is a diagram showing how FIGS. 13A–13I are assembled to form FIG. 13;

FIG. 14, consisting of FIGS. 14A and 14B, is a schematic diagram of a portion of the electrical circuit comprising the card reader of FIG. 1;

FIG. 14A is a portion of FIG. 14;

FIG. 14B is a portion of FIG. 14;

FIG. 14C is a diagram showing how FIGS. 14A and 14B are assembled to form FIG. 14;

FIG. 15, consisting of FIGS. 15A–15C, is a schematic diagram of a portion of the electrical circuit comprising the card reader of FIG. 1;

FIG. 15A is a portion of FIG. 15;

FIG. 15B is a portion of FIG. 15;

FIG. 15C is a portion of FIG. 15; and

FIG. 15D is a diagram showing how FIGS. 15A–15C are assembled to form FIG. 15;

The same reference characters refer to the same elements throughout the various FIGURES.

PREFERRED EMBODIMENT

Figure 4:
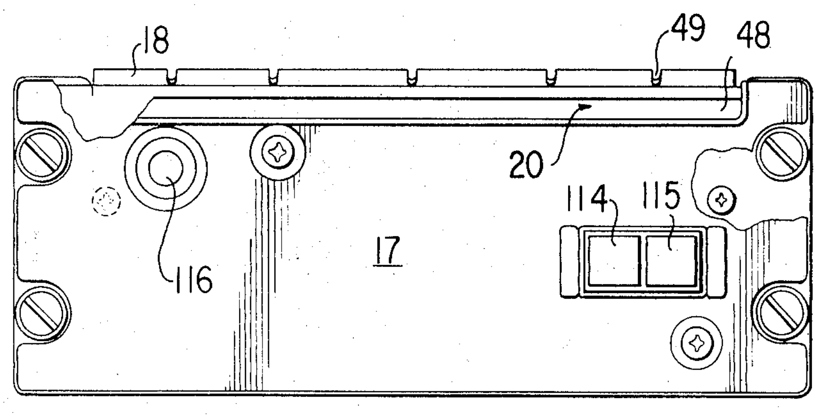
FIG. 4 is a front view of the card reader of FIG. 1 with the front panel installed.

Referring first to FIG. 1, there is shown a card reader 10. It generally comprises a housing 11, card guide means 12, a card capstan drive roller assembly 13, and a card read head assembly 14 including circuit boards 15 and 61. The card reader 10 further comprises electronic circuit elements mounted on circuit boards, such as circuit board 16, which are placed throughout the housing so as not to interfere with the path of the data cards. The housing also includes a top, not shown, on which several of the circuit boards are secured. The front panel 17 of the housing 11 is best seen in FIG. 4, and includes an entry-exit slot 20 for a data card 21. A forwardly protruding flange 18 facilitates insertion of the data card. The data card reader 10 also includes a multi-terminal connector plug 22, best seen in FIG. 2 for connecting the card reader to a source of DC power, and to a computer or other data storage and manipulation means to which the data read by the card reader is to be supplied.

Referring now to FIGS. 1 through 4, the housing 11 comprises a bottom plate 23 and vertical side walls 24, 25, and 26 upstanding therefrom. A bottom plate and side walls may be cast in one piece, or may be comprised of several pieces fastened together in an appropriate manner. The side wall 26 also comprises a side guide edge against which one edge of the data card is held during passage through the card reader.

The card guide means 12 has as one element a roof 27. The roof 27 is secured between side walls 24 and 26, and has a first portion 30 generally parallel to the bottom plate 23 and positioned slightly thereabove to define an entrance portion of the card path therebetween. This entrance portion is aligned with the entry-exit slot 20 of the front panel 17. The remaining upper portion of the roof 27 extends upward from the bottom plate 23, as best seen in FIGS. 1 and 2.

Figure 6:
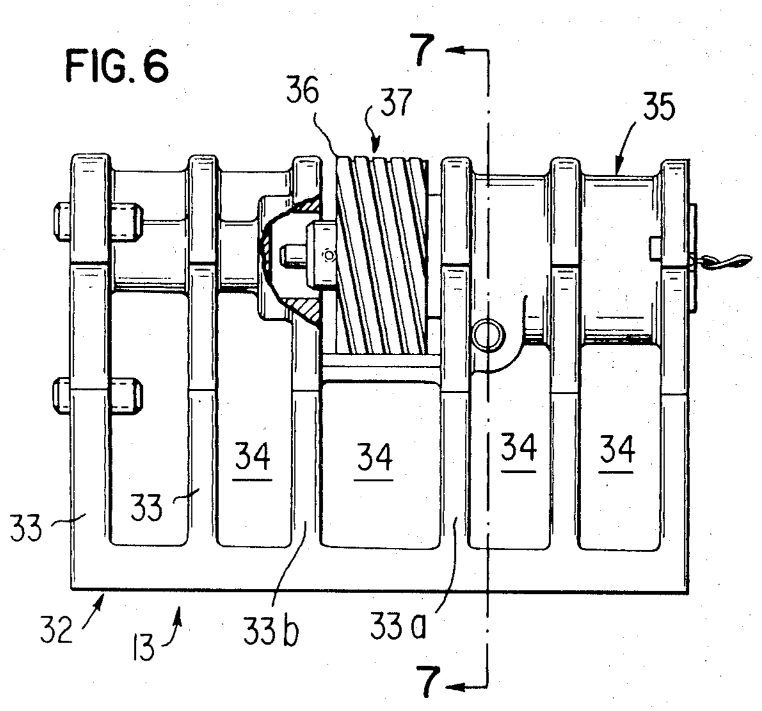
FIG. 6 is a top view of the drive roller assembly of the card reader of FIG. 1.
Figure 7:
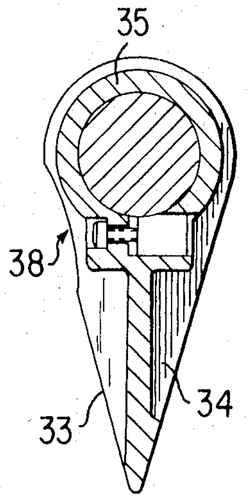
FIG. 7 is a sectional view of the drive roller assembly taken along the line 7—7 of FIG. 6.

Positioned between the upper portion of the roof 27 and the bottom plate 23 is the card drive roller assembly 13, which is shown in detail in FIGS. 6 and 7. The drive roller assembly is comprised of a frame 32 having tear drop-shaped ribs 33 connected by webs 34. The webs 34 are connected at one end to a cylindrical drive motor housing 35 wherein a card drive motor, not shown, is housed. The driver motor is connected to a capstan drive roller 36, which is mounted between the two centralmost ribs 33*a* and 33*b* of the frame 32. As can be seen in FIGS. 1 and 6, the surface 37 of the drive roller 36 comprises a series of helical surfaces, but the surface may also be smooth.

Figure 2:
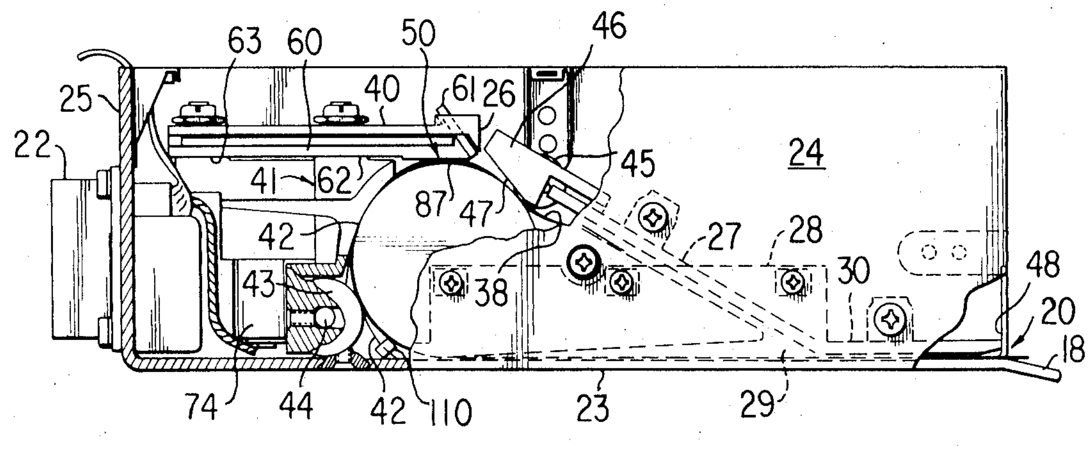
FIG. 2 is a sectional view of the card reader of FIG. 1.

The drive roller assembly 13 is installed between the bottom plate 23 of the housing 11 and the roof 27, as best seen in FIG. 2, and thereby further comprises a portion of the card guide means 12. The trailing, pointed end of the tear drop-shaped ribs 33 are displaced a greater distance from the bottom plate 23 than from the roof 27, so that a card inserted between the bottom plate 23 and roof portion 30 will be directed between the ribs 33 and the bottom plate 23. The forward or rounded portion of the tear drop-shaped card drive roller assembly comprising the drive motor housing 35 and the capstan roller 36 protrude from under the roof 27 and are surrounded by other members comprising means defining a path for the data card 21, as will be discussed below. The position of the drive roller assembly is adjusted to that there is a minimum of 0.012 inches between the bottom plate 23 and the drive roller 36, the drive motor housing 35, and the rounded portion of ribs 33. This is the minimum clearance necessary to assure that the data cards 21 will pass therethrough.

A leafspring 28 is attached to side wall 24 positioned with its free end 29 adjacent to the card path between bottom plate 23 and the bottom of the drive roller assembly 13. The spring 28 engages the edge of data card 21 and urges it against the opposite side guide wall 26.

When the drive roller assembly 13 is installed in the housing 11, the center of the capstan roller 36 is less than one-half of the width of data card 21 from the side guide edge 26, i.e., the capstan roller 36 is offset toward the side guide edge 26, with respect to a data card passing through the card reader. There are frictional forces on the card as it passes through the reader and those forces are less between the capstan roller and the guide wall 26 by virtue of the offset position of the roller. Therefore, the card tends to move toward the side guide wall as it passes through the card reader.

The card reader 10 further generally comprises the read head assembly 14, which more particularly comprises a drive plate 40, an aperture plate 60, a phototransistor circuit board 15, a light emitting diode (LED) circuit board 61, and an aperture plate support means 41. Referring to FIG. 2, extending from the aperture support means 41 toward the drive roller assembly 13 is a curved guide 42 providing a first triangular lower portion, which is positioned to engage the edge of an incoming card 21 and turn it upward along the front surface of the drive roller assembly 13, and a remaining curved portion, the front surface of which further defines a path along the front edge of the card drive roller assembly 13. The aperture plate 60 is mounted for sliding motion on top of flat surfaces 62 and 63 upstanding from the support 41, and protrudes outwardly over the card drive roller assembly. The clearance between the bottom of the aperture plate 60 and the card drive roller assembly is adjusted to be in the range of 0.010 to 0.012 inches.

Also mounted to the aperture plate support 41 is an entrance roller 43 located opposite the capstan roller 36. The axis 44 of the entrance roller 43 is adjusted to provide a separation of about 0.002 inch between it and capstan roller 36. A card passing therebetween deforms the rubber surface 37 of the capstan roller 36, which thereby engages the card and propels it through the card reader 10. It is important that the entrance roller 23 not contact the rubber surface 37 of the capstan roller 36, as that surface would become deformed.

Figure 3:
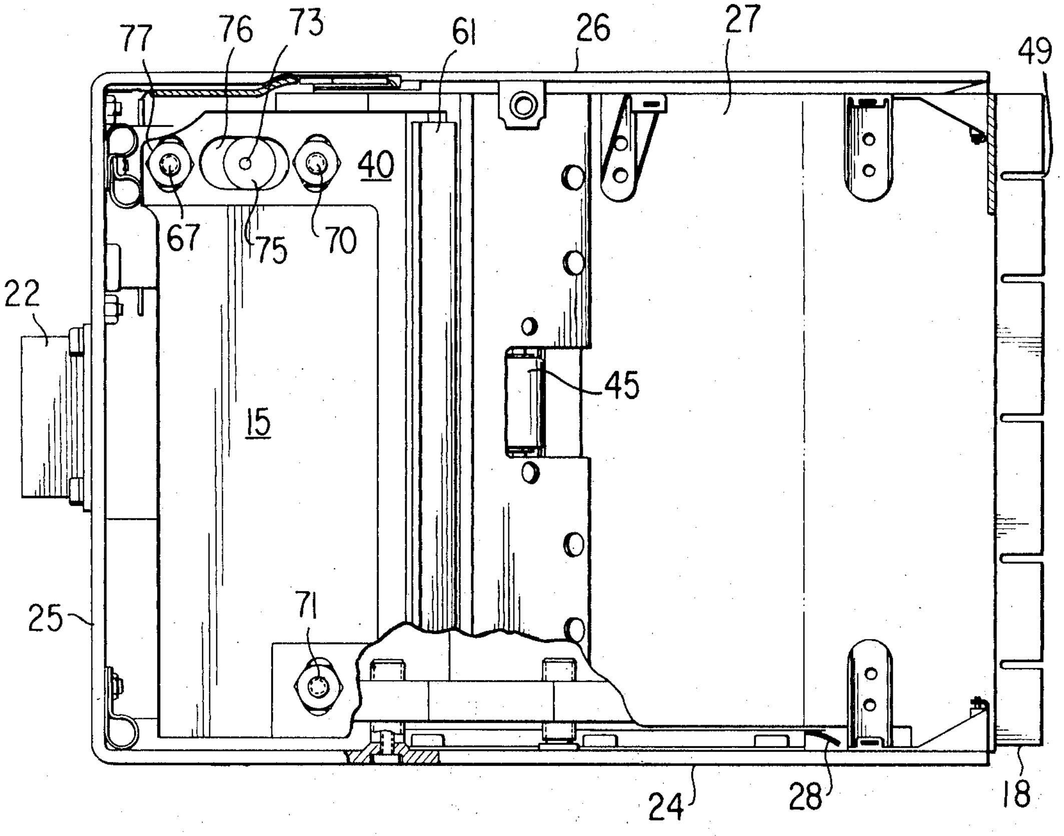
FIG. 3 is a top view of the card reader of FIG. 1.

Referring to FIGS. 2 and 3, mounted on the roof 27 is an exit roller 45 which is positioned in the recess or dip 38 (FIG. 7) in the ribs 33 of the card drive roller assembly 13. The exit roller 45 is mounted in a mounting bracket 46, which is in turn secured to the roof 27. The mounting bracket 46 has two inclined forward edges 47 which direct the edge of the card downward to pass under the exit roller 45. Thereafter, the data card 21 passes roof 27 and the upper portion of the tear drop-shaped card drive roller assembly 13, and then passes out the space between portion 30 of the roof and the bottom plate 23 to exit at the entrance-exit slot 20.

By positioning the exit roller 45 in the dip or recess 38 of the card drive roller assembly, the card is bent or biased upward as shown in FIG. 2 so that it contacts the lower surface of the aperture plate 60 at zone 50. A series of apertures 87, described below, are formed in the bottom of the aperture plate within zone 50 for reading the data card.

A resilient gasket 48 is positioned behind front panel 17, extending across the entry-exit slot 20. The card unit is often installed with the front panel 17 horizontal, and occasionally coffee or other liquids are accidentally spilled onto the front panel 17. The gasket 48 prevents entry of the liquid, as well as dust, into the card unit 10 in cooperation with the slots 49 in the front flange 18, the slots providing an escape route for the liquid. As seen in FIG. 1, the resilient gasket is easily deformed for entry and exit access of the data card 21.

Figure 5:
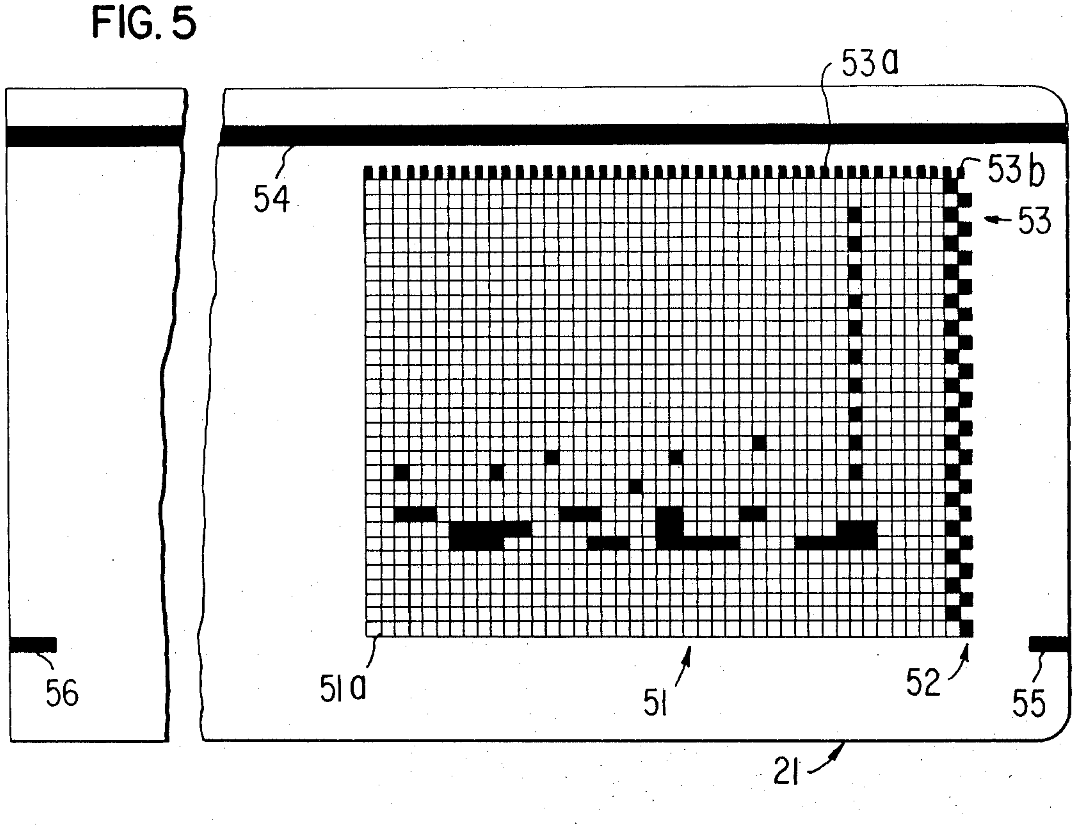
FIG. 5 is a plan view of a data card used with the card reader according to the invention herein.

Referring now to FIG. 5, there is shown a typical data card 21. It comprises a generally rectangular card which may be fabricated or cardboard or other suitably thick, yet flexible material wherein the card is sufficiently stiff so as not to wrinkle or deform in passing through the card reader 10, but is sufficiently flexible to pass around the curved tear drop-shaped card path. The leading corners of the card 21 may be rounded to facilitate inserting the card in the entry-exit slot 20, and also to distinguish the front edge of the card from the rear edge, which joins the side edges of the card at square corners. A data grid 51 is printed on the card 21. The data grid 51 generally comprises 32 rows of data spaces (horizontal in FIG. 5) arranged in columns (vertical in FIG. 5), the number of columns being determined by the amount of data to be put on the card and the length of the card itself. The dimensions of each data space, such as data space 51*a* are preferably 0.10 inches by 0.10 inches. The data spaces can be entirely blackened, and adjoined with neighboring data spaces. Data is entered on the card by blackening selected ones of the data spaces, the remaining data spaces being left white, i.e., the data is binary data represented by either a white or black area.

At the front edge of the data grid 51 is a test pattern 52. The error check test pattern comprises two columns of 32 data spaces each, the first column of which, commencing with the space nearest the bottom edge of the card as shown, being black and white alternating spaces. The second column also contains alternating white and black spaces wherein the first space is white, opposite to the black-white relationship of the spaces in the first column. The data spaces in the error check test pattern are preferably 0.10 inches square.

Positioned along the upper side of the data grid 51 and test pattern 52 is a row of timing marks 53. Each timing mark, such as timing mark 53*a* comprises a black mark the leading edge of which is positioned midway with respect to the adjacent column of data spaces. The timing marks, such as timing mark 53B, for the test pattern are also arranged with their leading edges midway with respect to the associated column. The size of the timing marks is 0.05 inches by 0.10 inches in this embodiment.

Also printed on the card 21 is a black servo stripe 54, which is 0.15 inches wide in the embodiment therein. The servo stripe 54 is parallel to the rows of data of the data grid 51, and is printed simultaneously therewith to insure the parallel relationship. The servo stripe is also printed generally parallel to the edge of the card 21. However, despite precautions taken in the printing process, the servo stripe and data grid are often skewed with respect to the edge of the data card or laterally misplaced with respect thereto, or both. Therefore, if the data card is positioned in the card reader by means of its edge only, and if the means for reading the data from the data grid is fixed with respect to the edge against which the card is positioned, it is possible that a shift between rows of data can occur. That is, a gradual transition from one data row to another data row passing under the aperture for reading a data row could occur, causing incorrect data output.

The data card 21 is further provided with a timing mark activate stripe 55 at the leading edge of the card, wherein the timing mark sensors are armed on the transition from black to white at the trailing edge of the timing mark activate stripe 55. A second timing mark deactivating stripe 56 is positioned at the opposite end of the card parallel with the timing mark activate stripe 55. The stripes 55 and 56 comprise a row adjacent to the bottom row of data grid 51.

The read head assembly 14 is mounted in the card reader 10 for reading the data on data card 21. Referring to FIG. 2, the read head assembly is comprised of an aperture plate 60, a photo-transistor carrying circuit board 15, a read head assembly drive plate 40, and a light emitting diode circuit board 61. The photo-transistor circuit board 15 is sandwiched between the read head drive plate 40 and the aperture plate 60 with the photo-transistors positioned in aperture openings in the aperture plate 60. The light emitting diode circuit board 61 is attached to the front of the aperture plate 60, with the light emitting diodes also positioned in apertures therein. The assembly 14 comprising the elements 40, 15, 60, and 61 are mounted for transverse sliding movement on elevated smooth sliding surfaces 62 and 63 of the read head assembly support 41. The elements are also secured together into the assembly 14, as is best seen in FIGS. 1 and 9.

Figures 8, 9, 10:
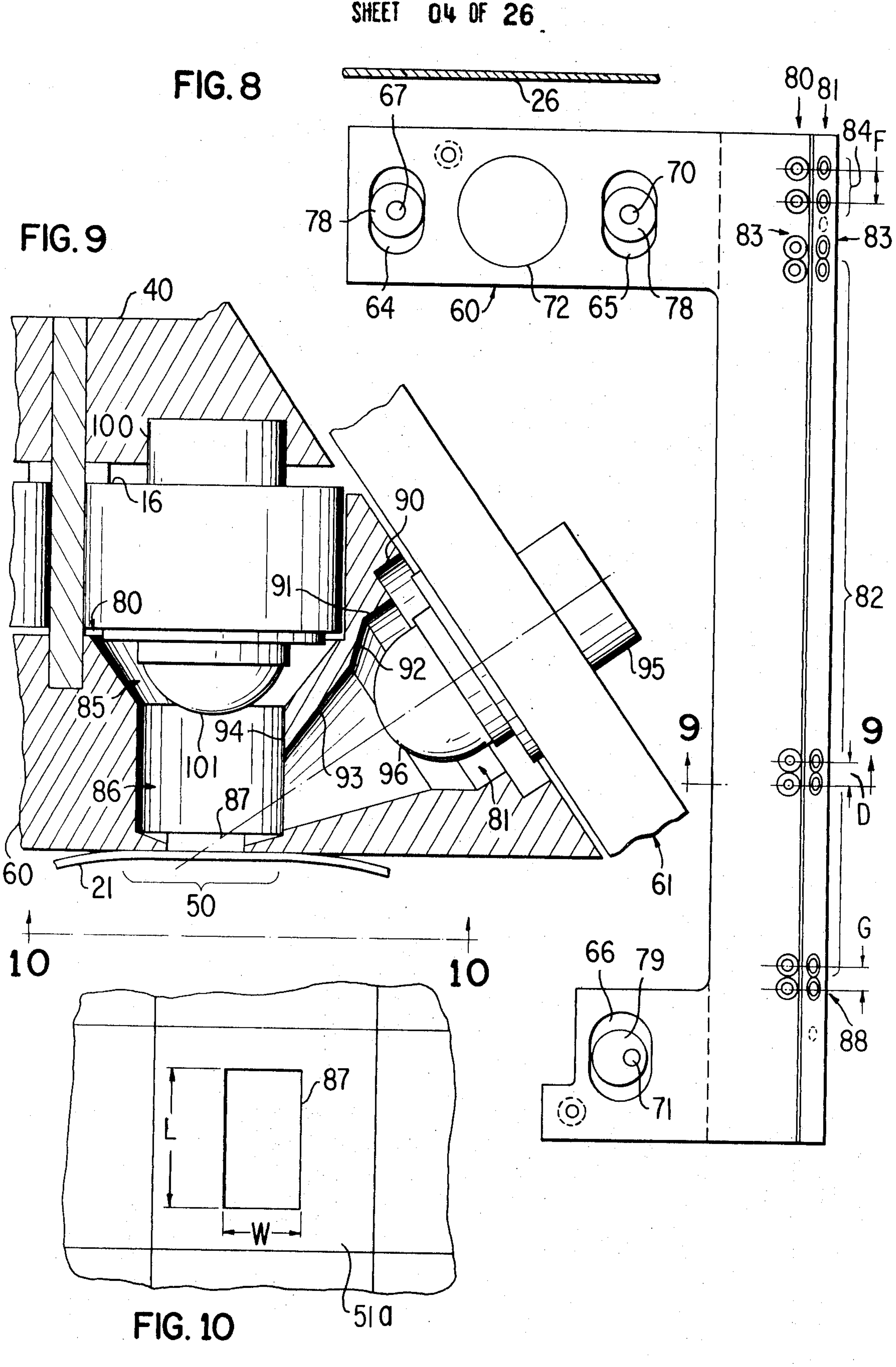
FIG. 8 is a top plan view of the aperture plate of the card reader of FIG. 1.
FIG. 9 is a sectional view, partially broken away, of the aperture plate of FIG. 8.
FIG. 10 is a plan view of the relationship of an aperture of the aperture plate to a data card passing thereunder.

Referring now to FIG. 8, there is shown a top plan view of the aperture plate 60. There are three elongated openings 64, 65 and 66 formed through the aperture plate, wherein the mounting studs 67, 70 and 71, respectively, may pass. A fourth large opening 72 provides a passage for the drive shaft 73 of a servo motor 74 (FIG. 1) and for a cam 75 which comprises a cylinder eccentrically mounted on the shaft 73. Similar openings are provided through the photo-transistor circuit board 15.

Referring to FIG. 3, the read head drive plate 40 also has openings approximately registering with openings 64, 65 and 66, and further has an elongated opening 76 the width of which is equal to the diameter of the cam cylinder 75, wherein the sides of the opening 76 engage the cam 75. The opening 76 is elongated in a direction substantially parallel to the side guide wall 26. Therefore, when the cam 75 is rotated; the read head assembly 14 is moved transverse to the side guide wall 26.

Referring again to FIG. 8, bushings 78 are positioned on the shafts 67 and 70 in the slots 64 and 65, and a small cam 79 is positioned on shaft 71 in slot 66. These cams 79 may be adjusted when the read head assembly 14 is installed over the shafts so that the front edge of the aperture plate is perpendicular to the side guide wall 26. The read head assembly 14 is secured onto the shafts 67, 70, and 71 by means of nuts 77, which are turned down sufficiently to prevent play, but not sufficiently tight to secure the read head assembly against sliding transverse movement.

Again referring to FIG. 8, the aperture palte 60 includes a plurality of openings 80 for receiving photo-transistors mounted on the photo-transistor circuit board 15, and openings 81 for receiving the light emitting diodes mounted on the light emitting diode circuit board 61. The openings 80 and 81 are arranged in pairs, and each pair terminates in a common aperture on the underside of the aperture plate 60.

The first group 82 of pairs of openings 80 and 81 comprises 32 such pairs for reading the 32 rows of data on a data card. The centers of these openings are spaced apart a distance D, which in the preferred embodiment is 0.10 inches, corresponding to the separation of the centers of the data spaces. Immediately adjacent to the pairs 82 is a pair of openings 83 for reading the row of timing marks. The openings 83 are also spaced apart from the adjacent pair of data reading openings 82 by a distance E equal to 0.10 inches in the preferred embodiment. A third pair of pairs of openings 84 are positioned for monitoring the edges of the servo stripe 54, these openings being separated by a distance F equal to 0.15 inches in the preferred embodiment. A pair of openings at 88 is provided adjacent to group 82 to receive an LED and photo-transistors for sensing the contrast of the timing mark activate and deactivate stripes, openings 88 separated from the adjacent pair of group 82 by a distance G equal to 0.10 inches.

Referring now to FIG. 9, one of the pairs of openings 80 and 81 is shown in section. The opening 80 comprises a truncated cone upper section 85 and a cylindrical lower section 86 opening into a rectangular aperture 87. The opening 81 comprises a first upper cylindrical portion 90 and a second smaller upper cylindrical portion 91. Two truncated cone sections 92 and 93 complete the openings 81, the lower truncated cone section 93 opening into the cylindrical portion 86 of opening 80 immediately above the aperture 87. The axes of both openings pass through aperture 87, and the axis of opening 81 is at approximately 30° with respect to the bottom surface of aperture plate 60.

A portion 94 of the aperture plate 60 provides a crosstalk barrier between the two openings 80 and 81.

The light emitting diode circuit board 61 has a plurality of light emitting diodes (LEDs) 95 mounted therethrough and spaced apart such that they are positioned in the openings 81 when the LED circuit board 61 is mounted to the aperture plate 60. A lens 96 of the LED 95 protrudes into the opening 81 approximately to the boundary between the two truncated cone portions 92 and 93. Light from the light emitting diode 95 is directed toward the aperture 87.

A plurality of photo-transistors 100 are mounted in the photo-transistor circuit board 16 appropriately positioned for insertion in the openings 80 of the aperture plate 60. The photo-transistors have a lens portion 101 which extends into the upper truncated cone portion 85 of the opening 80. Being positioned directly above the aperture 87, the photo-transistor is well oriented for sensing reflected light at the aperture 87.

Referring now to FIG. 10, the rectangular aperture 87 is shown superimposed on one of the data spaces of the data grid 51. The rectangular aperture opening preferably has a width W equal to 0.035 inches and a length L equal to 0.065 inches. The width of the data space is preferably 0.10 inches, wherein the rectangular aperture 87 is positioned over the data bit with some margin for error. Similarly, the length of the data bit is preferably 0.10 inches, leaving a margin of error. Because of the viewing area being smaller than the data bit, the accuracy with which the apertures are positioned, the contact between the aperture plate and the data card, and the absence of illumination of adjacent data bits, only pure data is read. That is, there is no mixing of response from adjacent data bits, as in readers wherein the read head does not contact the data card, and wherein the area illuminated and sensed is larger than a data bit.

As described above, the data card 21 contacts the lower side of the aperture plate 60 generally at a zone 50, which embraces the apertures 87. Therefore, the aperture 87 opens directly onto the data card. With the configuration shown, contrast ratios of approximately 20 to 1 are obtainable between black and white data squares. This is very much greater than the 4 to 1 contrast ratio achieved in the Republic RCR-2 prior art card reader, wherein there were no apertures contacting the card and no cross-talk barriers between the LED's and photo-transistors.

The size of the aperture should not be made substantially smaller in order to insure that it be positioned over a large data bit, because the amount of signal returnable from a smaller aperture may not be large with respect to the leakage current of the photo-transistors, particularly when the photo-transistors are operated at elevated temperatures. By designing the card reader in the manner described herein so as to achieve a 20 to 1 contrast ratio, the light returned from the aperture provides a strong signal which is easily distinguishable from the photo-transistor leakage current.

FIGS. 11 through 15 show schematically the electronics comprising the card reader 10. Except for instances in which the electronics are important to the invention herein, the electronics will be discussed only generally, as it is believed that one skilled in the art can construct a working circuit from the drawings and the indicia thereon.

FIG. 11 provides coordination among the remaining FIGURES, showing the interconnections between circuit boards comprising the circuits and also showing peripheral elements, such as the servo motor 74 and the like. For instance, in FIG. 11 there appear blocks indicating FIGS. 12 and 13, and a line originating at a terminal labeled E-19 on FIG. 12 and extending to an input terminal No. 23 labeled "DATA" on FIG. 13. Thus, on the upper right corner of FIG. 12, there is a terminal labeled "E-19" and a line labeled "DATA," and in FIG. 13 in the lower left corner there is shown a line "DATA" coming in to a pin 23. This method of labeling drawings is well known in the art, and will be readily understood by those skilled in the art. FIG. 11 further shows schematically an auto start sensor assembly 110 comprising a light emitting diode 111 and a photo-transistor 112 which are positioned in the path of the data card (see FIG. 2), wherein inserting the data card into the card reader blocks the light from the light emitting diode and alters the state of the photo-transistor 112. Also shown in FIG. 11 is the drive motor 113, which is physically positioned in the drive motor housing 35, a servo motor 74, and the interconnection plug 22, with the signals thereto labeled. FIG. 11 further shows an error lamp and switch 114 and read lamp and switch 115 which are positioned on the front panel 17 along with the auxiliary start switch 116.

Referring now to FIG. 15, there is shown a circuit 121 for producing a 40 KHz square wave output clock for use in the operation of the electronics of the card reader 10.

FIG. 14 shows generally a power supply 122, an oscillator 123 for producing a one-second flashing signal to the read lamp 115, so that the user will know that a computer connected to the card reader is requesting data and he will therefore put a data card in the card reader in order to provide that data. Also shown on the lower portion of FIG. 14 is auto-start circuitry 124 for turning on the power supply in response to sensing of a card at the auto-start sensor 110, circuitry 125 for producing a "RESET" signal for resetting all of the logic throughout the circuitry when a new card has entered the card reader, and a 25 second timer 126 for shutting off the power supply after 25 seconds.

Referring now to FIG. 12, there are shown 32 light emitting diodes 130 and photo-transistors 131 positioned in the group of openings 82 in aperture plate 60 for accomplishing reading of data, the contrast or timing mark activate light emitting diode 132 and photo-transistor 133 positioned in openings 88, the column mark light emitting diode 134 and photo-transistor 135 positioned in openings 83, and the two card servo stripe tracking light emitting diodes 136 and photo-transistors 137 positioned in openings 88. Referring to the data read light emitting diodes, they are wired together in four groups of eight light emitting diodes, each, the first group comprising Column I as shown in FIG. 12 being the light emitting diodes for data bits 1, 5, 9, 13, 17, 21, 25 and 29. The second group comprising the Column II are the light emitting diodes for bits 2, 6, 10, etc. The third group shown in Column III comprises the light emitting diodes for bits 3, 7, 11, etc. and the light emitting diodes of Column IV comprise the light emitting diodes for data bits 4, 8, 12, etc. The 32 photo-transistor 131 are connected to two decoding chips 138 and partial data decoding circuitry 139 which convert the data to serial output on the data line.

At the lower portion of FIG. 12, there is shown the two light emitting diodes 136 and the two photo-transistors 137 comprising the card servo sensors. The outputs of the two phototransistors are inputs to a comparator 120, the output of which is delivered to the servo motor power amplifier circuit 140 shown on FIG. 13.

Referring now to FIG. 13, there is generally shown circuits 141 for checking the accuracy of the reading of the test pattern and for setting an error signal if the test pattern is incorrect, and a seven and one-half second timer 142 during which reading of the test pattern must be successfully accomplished to avoid lighting the error light 114, accomplished by error set circuit 143. In the lower left hand corner of FIG. 13 is the circuitry 144 for switching on the banks of light emitting diodes in the manner described above. A signal labeled "G–CLK" which is comprised of a "column mark" signal and a one-quarter or 10 KHz clock is fed to 5 flip-flops 146, the outputs of which are delivered to a series of four OR gates 147. This combination provides signals switching on first Column 1 of LEDs, then second, Column II LEDs, then third Column III LEDs, and fourth, Column IV of LEDs. The current source for the LEDs is provided by circuitry 150.

FIG. 13 further shows the servo motor power amplifier circuit 140 which provides the signal operating the servo motor 74 for adjusting the position of the aperture plate over the data card. The power amplifier circuit 140 comprises a second order feedback circuit wherein overshoot and hunting are avoided in positioning the aperture plate. The light emitting diodes 130–132, 136 of FIG. 12, each have resistors placed in parallel that are used to determine the current through each of the light emitting diodes. This current is supplied from a constant current source.

Since light output is proportional to the current through a light emitting diode, the read head sensors can be matched by individual resistor selection. This is important because a wide variation is found in the optoelectric properties of individual photo-transistors and light emitting diodes. In addition, the effects of minute variations in the holes and physical mounting of the aperture plate, and circuit boards of the read head can be compensated for with this technique. Thus these resistors are necessarily selected after the read head is assembled to produce uniform sensor output. This matching of the sensors allows the data to be detected using a fixed criteria for all data bits as they are scanned and multiplexed into a serial data stream.

Also shown on FIG. 13 are circuits for data output in either ARINC 561 or ARINC 575 format.

The operation of the card reader is initiated by a data request from the computer which it serves. The data request causes the read light on the front panel to flash, informing the operator of the card reader that data is requested. The oscillator of FIG. 14 causes the read light to flash, aiding in attracting the operator's attention. The operator then selects the appropriate data card and inserts it into slot 20 on the front of the card reader. The card breaks the beam of light in the auto-start sensor assembly 110, wherein the power supply for the card reader is activated and the capstan roller 36 begins to turn. The operator pushes the card in sufficiently far that the capstan roller engages the card and propels it through the card reader at a rate of approximately 1 inch per second along the path described above. The edge of the card is aligned with the side guide wall 26 of the housing as it passes through the card reader by virtue of the leafspring 28, the offset position of the capstan roller 36, and the helical surface 37 thereof.

The read head is motionless as the card approaches because both of the servo stripe sensors see no light, and therefore no difference is sensed by the comparator 120 which would cause the read head to be moved by the servo motor 74. However, when the card is positioned under the read head, unless the servo stripe is perfectly aligned between the two servo stripe sensors, a difference in signal from the photo-transistors 137 will be presented to the comparitor 122, and therefrom to the power amp 140 for the servo motor, and the servo motor will adjust the position of the read head so that the two photo-transistors are precisely at the edge of the servo stripes, thereby also positioning the remainder of the light emitting diodes and photo-transistors in proper relation to the data grid, column marks, and the like. The power amp for the servo motor is critically damped to prevent overshoot, and the power applicable to the servo motor is very high providing a very quick response time.

With the read head properly aligned with the data card, and the data card moving through the card reader, the contrast sensor positioned over the timing mark activate stripe 55 senses the change from black to white, wherein the column mark sensor is activated. Upon the first column mark, the first column of the test pattern 52 is read. If it is correct, the ADEU valid line from one of the outputs at connector 22 shown in FIG. 11, indicates to the computer that the card reader is operating properly. If the second column of the test pattern is also read correctly, the ADEU line continues to indicate that the card reader is operating properly, and data reading commences.

If the test pattern is read inaccurately, the ADEU valid line signals that the card reader is operating improperly, and the error lamp on the front panel of the card reader lights.

A seven second time limit is imposed for proper reading of the test pattern. Therefore, if the card is inserted improperly, as for instance upside down, the error lamp will come on in seven seconds because no test pattern was properly read. The drive motor will continue to run for 25 seconds, so that the card will be returned, after which it may be re-inserted properly.

After the test pattern has been read correctly, the column mark sensor encounters the third column mark, which is adjacent to the first column of data. The groups of LEDs are turned on as described above, as are the photo-transistors, wherein the data is read and transmitted serially out of the unit at a 10 KHz rate in both the ARINC 575 and ARINC 561 format. The remaining columns of data are read in this manner.

When all of the data has been read, no further column marks appear and no further scan takes place. At the trailing edge of the card, the contrast sensor again senses black at the timing mark deactivate stripe 56, inhibiting further data scans. This prevents the transition from white to black at the end of the card in the column mark row from being improperly interpreted as another column mark. The card passes from under the read head, wherein both of the servo sensors are uniformly black, providing no differential in output and no resultant movement of the read head. The read head remains stationary until another card is inserted.

The drive motor continues to run for the 25 seconds, wherein the card is expelled from the card reader.

In the event that the card is not expelled from the card reader prior to the 25 second timer timing out, as may occur if the user does not push the card sufficiently into the unit to engage the card between the entry roller 43 and a capstan roller 46, the card may be expelled by restarting the drive motor by means of the auxiliary start switch 116 mounted on the front panel 17.

The read lamp 115 may be tested by depressing its mounting on front panel 17. Therefore, if the user expects to receive a data request and does not, he has means to insure that the read lamp for signalling a data request is operative. Depressing the read lamp and error lamp mounting also resets the error circuitry after an error has been indicated.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A data card reader comprising:

A. a housing having a side guide wall;

B. guide means defining a card path, the edge of said card path terminating at the guide wall;

C. a capstan roller positioned adjacent to the card path for engaging the surface of the card and propelling it through the data card reader, said capstan roller positioned less than half of the width of the card from the guide wall, wherein the roller urges the edge of the data card passing through the path against the guide wall;

D. a read head having formed therein at least three slotted mounting openings; and, E. at least three mounting studs upstanding in the housing and passing through the mounting openings in the read head for mounting the read head adjacent to the card path, at least one of said studs being provided with a cam positioned in a slotted opening for adjusting the angle between the side guide wall and the read head.

2. A card reader as defined in claim 1 and further comprising:

F. a leaf spring positioned adjacent to the card path opposite the guide wall for engaging one edge of a data card and urging the data card against the guide wall.

3. A data card reader as defined in claim 1 wherein the read head is mounted for sliding transverse movement with respect to the side guide wall.

4. A card reader as defined in claim 3 wherein the data card to be read therein has a servo stripe parallel to rows of data printed thereon and further comprising:

G. a drive slot in the read head elongated with respect to the side guide wall;

H. a servo motor having a cam attached thereto, said cam positioned in the drive slot in the read head; and, I. two sensors mounted on the read head approximately over the position of the servo stripe and spaced apart the width of the servo stripe, wherein the output of the sensors controls the input to the servo motor for transversely moving the read head to an adjusted position with one sensor over each edge of the servo stripe.

5. A data card reader as defined in claim 4 wherein the outputs of the sensors are connected to a comparator, and the comparator controls the output of a power amplifier providing signal to the servo motor.

6. A card reader for reading data cards with rows and columns of data bits printed thereon comprising:

A. an aperture plate having a plurality of apertures formed in the bottom thereof, one aperture for each row of data to be read;

B. sets of two openings formed in the aperture plate for each aperture, the two openings of each set intersecting at the apertures with a barrier formed therebetween by a remaining portion of the aperture plate;

C. a light emitting element mounted in one of the openings of each set opposite the aperture and a light sense elememt mounted in the other opening of the set opposite the aperture wherein both elements optically communicate with the aperture and said remaining portion of the aperture plate screens the two elements from cross talk; and D. means for positioning the data card against the bottom of the aperture plate with the data bits aligned with the aperture openings, said positioning means including first curved path defining means convex with respect to the bottom of the aperture plate wherein the aperture plate is positioned tangent to the curve, and second reverse curved path defining means joining with the first curved path defining means at a point offset from under the apertures, wherein the reverse curved path defining means biases the card upward from the first curved path defining means.

7. A card reader as defined in claim 6, wherein the emitter end receptor optics of the light emitting and light responsive elements comprise cones which are larger than the aperture at the aperture opening.

8. A card reader as defined in claim 6, wherein the apertures are aligned.

9. A card reader comprising:

A. means defining a card path;

B. a guide wall terminating one edge of the guide path and means for holding the card against the guide wall;

C. a read head having formed therein at least three slotted mounting openings; and, D. at least three mounting studs supported for mounting the read head adjacent to the card path, at least one of such studs being provided with a cam positioned in one of the slots for adjusting the angle between the guide wall and the read head.

10. A card reader comprising:

A. a front panel having an entrance-exit slot formed therein;

B. a flange protruding from the front panel adjacent to the entry-exit slot for guiding a card therein, said flange having a series of slots formed therein and extending to the entry-exit slot; and, C. a resilient rubber gasket disposed across the entry-exit slot, the lower edge of said gasket positioned to abut against the flange at the termination of the slots therein, wherein liquids spilled in the entry-exit slot are prohibited from entering the card reader by the gasket, and wherein the liquids can escape the vicinity of the entry-exit slot through the slots in the flange.

11. A card reader for reading data cards having rows and columns of data printed thereon and further having a servo stripe printed thereon generally parallel to the rows of data, comprising:

A. means defining a card path;

B. a read head positioned adjacent to the card path and mounted for transverse sliding movement with respect thereto;

C. two apertures formed in the read head and spaced apart by the width of the servo stripe;

D. two sensors, one mounted for communication with one of the apertures and the other mounted for communication with the second aperture; and E. drive means responsive to the outputs of the two sensors for sliding the read head into a position wherein each of the two apertures is positioned on one edge of the servo stripe.

12. A card reader as defined in claim 11, wherein the outputs of the two sensors are connected to a comparator.

13. A mark sensing data reader comprising:

A. a plurality of light sources arranged side by side in a line and identified as 1, 2, 3, up to *n;* and, B. means for illuminating said light sources sequentially in $x$ groups comprising the 1, $\mathbf{1}+x$, $\mathbf{1}+\mathbf{2}x$, up to $\mathbf{1}+ix$ light sources, the 2, $\mathbf{2}+x$, $\mathbf{2}+\mathbf{2}x$, up to $\mathbf{2}+ix$ light sources, up to and including the so defined group starting with the $x$ light source, each group being illuminated separately in sequence during each cycle of illumination, wherein two adjacent light sources are never simultaneously illuminated and the amount of switching required is minimized.

14. The mark sensing data reader defined in claim 13, wherein said light sources are light emitting diodes.

15. The mark sensing data reader defined in claim 13, and

C. a plurality of photo cells arranged side by side in a line and identified as 1, 2, 3, up to *n*, one photo cell per light source, such that each photo cell is arranged to receive the light from a different one of said light sources, all of said photo cells having their outputs connected in parallel; and D. means for conditioning said photo cells for producing output signals sequentially in groups comprising $x$ adjacent photo cells, each group conditioned for a complete cycle of illumination of all groups of said light sources.

16. The mark sensing data reader defined in claim 15, wherein said light sources are light emitting diodes.

17. The mark sensing data reader defined in claim 16, wherein said photo cells are photo-transistors.

* * * * *